US012646132B2

(12) United States Patent
Uhrenholt et al.

(10) Patent No.: US 12,646,132 B2
(45) Date of Patent: Jun. 2, 2026

(54) GRAPHICS PROCESSING

(71) Applicant: Arm Limited, Cambridge (GB)

(72) Inventors: Olof Henrik Uhrenholt, Lomma (SE); Thomas Weber, Trondheim (NO)

(73) Assignee: ARM Limited, Cambridge (GB)

( * ) Notice: Subject to any disclaimer, the term of this patent is extended or adjusted under 35 U.S.C. 154(b) by 118 days.

(21) Appl. No.: 18/478,657

(22) Filed: Sep. 29, 2023

(65) Prior Publication Data

US 2025/0111465 A1 Apr. 3, 2025

(51) Int. Cl.
*G06T 1/20* (2006.01)

(52) U.S. Cl.
CPC .................................... *G06T 1/20* (2013.01)

(58) Field of Classification Search
CPC .................................... G06T 1/20; G06T 1/60
USPC .................. 345/505, 522; 712/217; 711/140; 713/193
See application file for complete search history.

(56) References Cited

U.S. PATENT DOCUMENTS 7,023,437 B1 4/2006 Voorhies et al.
11,127,188 B1 9/2021 Uhrenholt
11,132,835 B1 9/2021 Uhrenholt
11,256,720 B1 * 2/2022 Hoffman ........... G06F 16/24554
2003/0225898 A1 12/2003 Saika
2005/0195197 A1 * 9/2005 Wolfe ..................... G06T 11/40 345/505
2006/0129730 A1 * 6/2006 Morishima ........... G06F 3/0689 710/244
2008/0189560 A1 * 8/2008 Case ................... G06F 12/1458 713/193
2012/0102175 A1 * 4/2012 Ito ........................... G06F 30/33 709/223
2012/0304194 A1 11/2012 Engh-Halstvedt et al.
2014/0368516 A1 * 12/2014 Taggart ................. G06T 15/005 345/505
2015/0032969 A1 * 1/2015 Bratt ................... G06F 12/0855 711/140
2015/0220341 A1 * 8/2015 Ohannessian, Jr. .......................... G06F 9/30087 712/217
2016/0239939 A1 8/2016 Kakarlapudi
2017/0148204 A1 5/2017 Hakura et al.
2017/0212764 A1 * 7/2017 Lyberis ............... G06F 9/30032
2017/0316601 A1 11/2017 Kakarlapudi et al.
(Continued)

FOREIGN PATENT DOCUMENTS

GB 2595025 A 11/2021

OTHER PUBLICATIONS

U.S. Appl. No. 18/478,121, filed Sep. 29, 2023, "Graphics Processing".
(Continued)

*Primary Examiner* — Prabodh M Dharia
(74) *Attorney, Agent, or Firm* — Pearl Cohen Zedek Latzer Baratz LLP

(57) ABSTRACT

A method of managing write-after-read (WAR) hazards in a graphics processor. A host processor when preparing a graphics processor command stream can identify possible WAR hazards between rendering jobs for example by detecting layout transitions and insert a suitable barrier into the graphics processor command stream. The graphics processor when encountering such a barrier can then determine whether it is possible to ignore the barrier and allow rendering jobs to be processed concurrently.

8 Claims, 13 Drawing Sheets

(56) References Cited

U.S. PATENT DOCUMENTS

| | | | | |
|---|---|---|---|---|
| 2018/0158168 | A1 | 6/2018 | Foo | |
| 2018/0165788 | A1 | 6/2018 | Balci | |
| 2019/0088009 | A1 | 3/2019 | Forey et al. | |
| 2020/0065935 | A1 | 2/2020 | Yang | |
| 2020/0111247 | A1 | 4/2020 | Heggelund | |
| 2020/0379909 | A1* | 12/2020 | Uhrenholt | G06F 12/0831 |
| 2021/0192672 | A1 | 6/2021 | McCrary | |
| 2022/0020108 | A1* | 1/2022 | Uhrenholt | G06F 9/30123 |
| 2022/0101479 | A1 | 3/2022 | Alla et al. | |
| 2024/0078634 | A1 | 3/2024 | Yang et al. | |
| 2024/0169645 | A1* | 5/2024 | Øygard | G06T 15/005 |
| 2024/0320896 | A1 | 9/2024 | Ma | |
| 2025/0053519 | A1* | 2/2025 | Foley | G06F 12/1441 |

OTHER PUBLICATIONS

U.S. Appl. No. 18/478,131, filed Sep. 29, 2023, "Graphics Processing".

U.S. Appl. No. 18/478,078, filed Sep. 29, 2023, "Graphics Processing".

U.S. Appl. No. 18/483,972, filed Oct. 10, 2023, "Graphics Processing".

U.S. Appl. No. 18/894,496, filed Sep. 24, 2024, "Graphics Processing".

Combined Search and Examination Report under Sections 17 and 18(3), dated Feb. 4, 2025, GB Application No. GB2414257.2, 5 pages.

Combined Search and Examination Report under Sections 17 and 18(3), dated Mar. 26, 2024, GB Patent Application No. GB2315009.7.

Non-Final Office Action dated May 19, 2025, U.S. Appl. No. 18/478,078, 25 pages.

Non-final Office Action dated Jul. 9, 2025, U.S. Appl. No. 18/478,131, filed Sep. 29, 2023.

Non-final Office Action dated Aug. 18, 2025, U.S. Appl. No. 18/478,121, filed Sep. 29, 2023.

Response to Office Action dated Aug. 26, 2025, U.S. Appl. No. 18/478,131, filed Sep. 29, 2023.

Notice of Allowance dated Sep. 18, 2025, U.S. Appl. No. 18/478,131, filed Sep. 29, 2023.

Response to Office Action dated Sep. 19, 2025, U.S. Appl. No. 18/478,078, filed Sep. 29, 2023.

Final Office Action dated Sep. 30, 2025, U.S. Appl. No. 18/478,078, filed Sep. 29, 2023.

Non-final Office Action dated Oct. 20, 2025, U.S. Appl. No. 18/483,972, filed Oct. 10, 2023.

Response to Office Action dated Nov. 7, 2025, U.S. Appl. No. 18/483,972, filed Oct. 10, 2023.

Notice of Allowance dated Dec. 4, 2025, U.S. Appl. No. 18/483,972, filed Oct. 10, 2023.

Response to Office Action dated Dec. 18, 2025, U.S. Appl. No. 18/478,121, filed Sep. 29, 2023.

Response to Office Action dated Dec. 29, 2025, U.S. Appl. No. 18/478,078, filed Sep. 29, 2023.

* cited by examiner

FIG. 12
RenderPass 1
Read
Image A
Attachment Write
RenderPass 2

GRAPHICS PROCESSING

BACKGROUND

The technology described herein relates to performing graphics processing, and in particular to the operation of graphics processors when performing a sequence of rendering jobs, e.g. to generate one or more outputs, e.g. frames, e.g. for display.

Graphics processing is normally carried out by first dividing the graphics processing (render) output to be rendered, such as a frame to be displayed, into a number of similar basic components of geometry to allow the graphics processing operations to be more easily carried out. These basic components of geometry may often be referred to graphics "primitives", and such "primitives" are usually in the form of simple polygons, such as triangles, points, lines, etc. (or groups thereof).

Each primitive (e.g. polygon) is at this stage defined by and represented as a set of vertices. Each vertex for a primitive has associated with it a set of data (such as position, colour, texture and other attributes data) representing the vertex. This "vertex data" is then used, e.g., when rasterising and rendering the primitive(s) to which the vertex relates in order to generate the desired render output of the graphics processing system.

For a given output, e.g. frame to be displayed, to be generated by the graphics processing system, there will typically be a set of vertices defined for the output in question. The primitives to be processed for the output will then be indicated as comprising given vertices in the set of vertices for the graphics processing output being generated. Typically, the overall output, e.g. frame to be generated, will be divided into smaller units of processing, referred to as "draw calls". Each draw call will have a respective set of vertices defined for it and respective primitives that use those vertices. For a given frame, there may, e.g., be of the order of a few thousand draw calls, and hundreds of thousands (or potentially millions) of primitives.

Once primitives and their vertices have been generated and defined, they can be processed by the graphics processor, in order to generate the desired graphics processing output (render target), such as a frame for display. This basically involves determining which sampling positions of an array of sampling positions associated with the render output area to be processed are covered by a primitive, and then determining the appearance each sampling position should have (e.g. in terms of its colour, etc.) to represent the primitive at that sampling position. These processes are commonly referred to as rasterising and rendering, respectively. (The term "rasterisation" is sometimes used to mean both primitive conversion to sample positions and rendering. However, herein "rasterisation" will be used to refer to converting primitive data to sampling position addresses only.)

(It will be appreciated that rasterisation-based rendering as described above is merely one approach for producing a render output and other types of rendering operation exist that may be implemented by a graphics processor including, for example, ray tracing or hybrid ray tracing rendering operations.)

One form of graphics processing uses so-called "tile-based" rendering. In tile-based rendering, the two-dimensional render output (i.e. the output of the rendering process, which may be an output frame to be displayed but could be an "intermediate" output or other suitable render target, as will be explained further below) is rendered as a plurality of smaller area regions, usually referred to as rendering "tiles", which rendering tiles can then be (and are) rendered separately. The rendered tiles are then recombined to provide the complete render output, e.g. frame, e.g. for display.

In such arrangements, the render output, e.g. frame to be displayed, is typically divided (by area) into regularly-sized and shaped rendering tiles (they are usually e.g., squares or rectangles), but this is not essential and other arrangements are possible.

(Other terms that are commonly used for "tiling" and "tile-based" rendering include "chunking" (the rendering tiles are referred to as "chunks") and "bucket" rendering. The terms "tile" and "tiling" will be used hereinafter for convenience, but it should be understood that these terms are intended to encompass all alternative and equivalent terms and techniques wherein the render output is rendered as a plurality of smaller area regions.)

Modern graphics processors typically include one or more processing (shader) cores, that execute, inter alia, programmable processing stages, commonly referred to as "shaders", of a graphics processing pipeline that the graphics processor implements.

A graphics processor processing (shader) core is thus a processing unit that performs processing by running (typically small) programs for each "work item" in an output to be generated. In the case of generating a graphics output, such as a render target, such as a frame to be displayed, a "work item" in this regard may be a sampling position, e.g., in the case of a fragment shader, but could also be a vertex, or a ray, for example, depending on the graphics processing (shading) operation in question. In the case of compute shading operations, each "work item" in the output being generated will be, for example, the data instance (item) in the work "space" that the compute shading operation is being performed on.

In order to execute shader programs, a graphics processor will include an appropriate execution unit or units (circuit or circuits) for that purpose. The execution unit(s) will include programmable processing circuit(s) for executing shader programs (the "shaders" of graphics processing pipeline).

The actual data processing operations that are performed by the execution unit when executing that shader program are usually performed by respective functional units of the execution unit, which may include (but are not limited to) a texture mapping unit that is configured to perform certain texturing operations. Thus, the functional units will in response to and as required by instructions in a (shader) program being executed perform appropriate data processing operations.

In addition to the programmable execution unit that executes the shader programs (using its associated functional units) the graphics processor processing (shader) core may typically also include one or more essentially fixed-function (hardware) stages for implementing certain stages of the graphics processing (rendering) pipeline. These fixed-function stages can be used to handle certain fragment "frontend" processing operations for setting-up the fragment shader program (which may include, for example, primitive list reading, resource allocation, vertex fetching, rasterisation, early depth/stencil testing, but various arrangements would be possible, e.g. depending on the particular configuration of the graphics processing pipeline) and also certain post-shader actions, such as late depth/stencil testing or tile write-out.

Thus, the graphics processor processing (shader) core is operable and configured to implement an instance of the graphics processing pipeline for processing a given rendering task with the processing (shader) core operable and configured to load the required data for setting up the shader program and then executing the desired fragment shader program to perform the actual rendering operation. The output of the rendering task is then written out accordingly.

Typically there may be many parallel processing (shader) cores within a graphics processor such that the graphics processor is capable of simultaneously processing plural different rendering tasks in parallel. Thus, in a tile-based rendering system, respective tasks for processing different tiles may be issued to different processing (shader) cores such that the tiles can be rendered in parallel. This can therefore provide a more efficient graphics processor operation.

Thus, when the graphics processor receives a command to generate a particular render target, i.e. by performing a render pass whose output is the desired render target (and which render pass may generally comprise one or more rendering jobs, each rendering job comprising a respective set of rendering tasks to be processed for the desired render target), the command is then processed within a suitable command processing unit (e.g. a command stream frontend/job manager) of the graphics processor to identify the rendering jobs to be performed, and a suitable (fragment) task iterator then schedules the processing of the respective sets of rendering tasks to be performed for the rendering jobs for the render pass accordingly, with the rendering tasks being allocated to the available processing (shader) cores for processing.

Although described above in relation to a single render pass, it will be appreciated that multiple render passes may generally be performed as part of generating a single output, e.g. a single frame, e.g. for display.

For example, a given rendering job within a render pass may generate a "final" output, e.g. a frame, e.g. for display. However, in general, there may be multiple rendering jobs and multiple render passes that are performed in order to generate a given final output (frame). Thus, a given rendering job (within a given render pass) may, e.g., generate an "intermediate" output, such as a "render to texture" output (i.e. a texture), that is then used by a subsequent rendering job (e.g., within the next render pass, although it could also be used by another rendering job within the same render pass) when generating the final output, e.g. frame. This can provide a more efficient graphics processor operation, e.g. compared to simply generating the final output (frame) in full by a single rendering job (render pass).

Similarly, it will be appreciated that most graphics processing applications do not require only a single output, e.g. frame, to be generated in isolation, but rather will typically require a sequence of outputs, e.g. frames, to be generated, e.g. for a continued display.

The graphics processor when generating one or more frames may thus generally be operable and configured to perform a sequence of render passes, with each render pass comprising one or more rendering jobs for generating a respective (overall) output for that render pass. The different render passes in a sequence of render passes being performed may in some cases be independent of each other (e.g. where they relate to different frames, or exclusively write to different (data buffers). However, it is also often the case that at least some of the different render passes in a sequence of render passes being performed are related to each other. For example, this may be the case when one render pass generates a "render to texture" or other suitable "intermediate" output that is then consumed by the next render pass. There may also be dependencies between rendering jobs within a particular render pass, e.g. where a "compute" job performs calculations based on a render output produced by a preceding fragment job.

Thus, in a given sequence of rendering jobs to be performed, there may be certain data (processing) dependencies between rendering jobs that if not enforced may lead to certain artefacts in the final rendered output.

The Applicants, however, believe that there remains scope for improvements to the operation of graphics processor when performing a sequence of rendering jobs, and wherein there may be certain data (processing) dependencies between different rendering jobs in the sequence of rendering jobs being performed.

BRIEF DESCRIPTION OF THE DRAWINGS

A number of embodiments of the technology described herein will now be described by way of example only and with reference to the accompanying drawings, in which.

DETAILED DESCRIPTION

Figure 1:
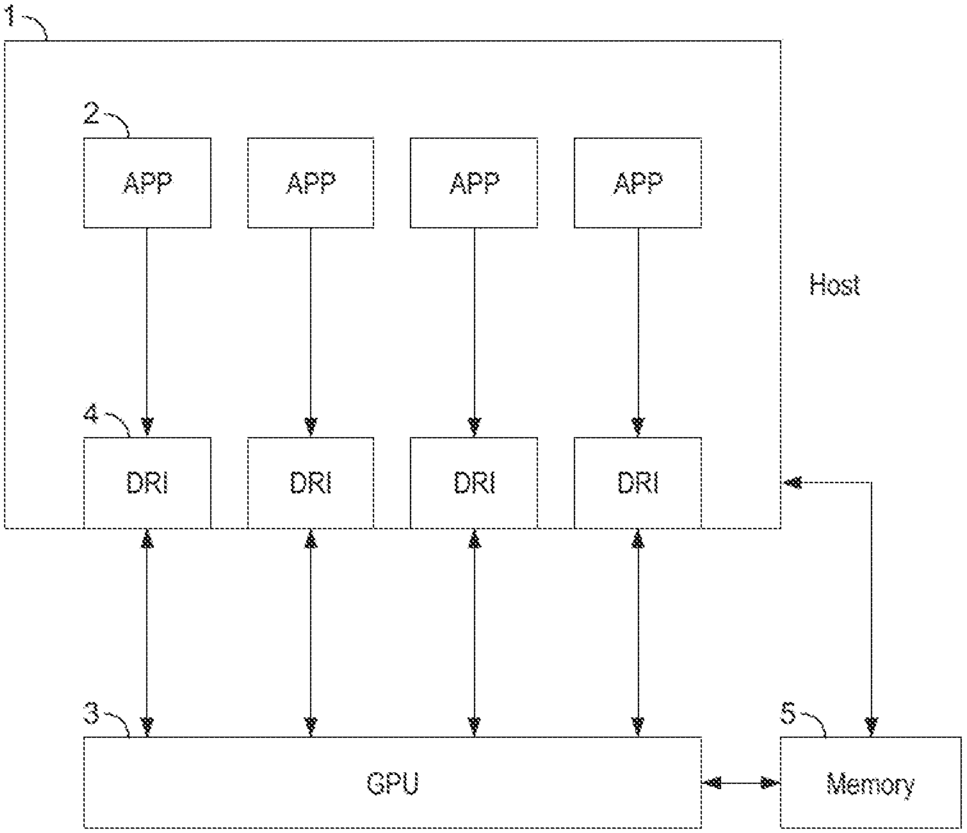
FIG. 1 shows an exemplary computer graphics processing system.

A first embodiment of the technology described herein comprises a method of operating a graphics processing system including a host processor and a graphics processor that is operable in response to commands prepared by the host processor to perform a sequence of rendering jobs, the method comprising:

the host processor:

when preparing one or more command streams for the graphics processor to perform a sequence of rendering jobs, wherein each rendering job in the sequence of rendering jobs is potentially operable to read data from or write data to one or more of a set of available data buffers according to a set of memory access conditions defined for the rendering job in question that define respective memory access permissions for the data buffers in the set of available data buffers:

(i) detecting possible write-after-read (WAR) hazards in which a later rendering job in the sequence of rendering jobs potentially writes to a data buffer that an earlier rendering job in the sequence of rendering jobs may need to read data from by identifying whether the memory access permissions for any of the data buffers in the set of available data buffers change between the earlier and later rendering jobs from a state in which data can be read from the data buffer to a state in which data can be written to the data buffer; and (ii) when a possible WAR hazard is detected between a second, later rendering job and a first, earlier rendering job in the sequence of rendering jobs to be performed, providing with the command stream associated with the second, later rendering job an indication that a possible WAR hazard has been detected relating to the first, earlier rendering job;

the method further comprising:

the graphics processor:

when processing the one or more command streams prepared by the host processor to perform the sequence of rendering jobs including the second, later rendering job and the first, earlier rendering job to which the possible WAR hazard relates:

(i) in response to the indication that there is a possible WAR hazard between the second, later rendering job and the first, earlier rendering job: determining whether the possible WAR hazard can be safely ignored by determining whether there is any potential overlap in the set of available data buffers between the data buffers that the second, later rendering job potentially writes to and the data buffers that the first, earlier rendering job may need to read data from; and (ii) when it is determined that the possible WAR hazard between the second, later rendering job and the first, earlier rendering job can be safely ignored: permitting the graphics processor to start processing the second, later rendering job.

A second embodiment of the technology described herein comprises a graphics processing system including:

a host processor; and a graphics processor that is operable in response to commands prepared by the host processor to perform a sequence of rendering jobs, the graphics processor including a set of one or more processing cores;

the graphics processing system configured such that:

a command stream preparing circuit of the host processor is configured to:

when preparing one or more command streams for the graphics processor to perform a sequence of rendering jobs, wherein each rendering job in the sequence of rendering jobs is potentially operable to read data from or write data to one or more of a set of available data buffers according to a set of memory access conditions defined for the rendering job in question that define respective memory access permissions for the data buffers in the set of available data buffers:

(i) detect possible write-after-read (WAR) hazards in which a later rendering job in the sequence of rendering jobs potentially writes to a data buffer that an earlier rendering job in the sequence of rendering jobs may need to read data from by identifying whether the memory access permissions for any of the data buffers in the set of available data buffers change between the earlier and later rendering jobs from a state in which data can be read from the data buffer to a state in which data can be written to the data buffer; and (ii) when a possible WAR hazard is detected in which a later rendering job in the sequence of rendering jobs potentially writes to a data buffer that an earlier rendering job in the sequence of rendering jobs may need to read data from: providing with the command stream associated with the later rendering job an indication that a possible WAR hazard relating to the earlier rendering job has been detected; and a command stream processing circuit of the graphics processor is configured to:

when processing one or more command streams to perform a sequence of rendering jobs:

(i) in response to an indication provided with a command stream that there is a possible WAR hazard between a later rendering job and an earlier rendering job in the sequence of rendering jobs to be performed: determine whether the possible WAR hazard can be safely ignored by determining whether there is any potential overlap in the set of available data buffers between the data buffers that the later rendering job potentially writes to and the data buffers that the earlier rendering job may need to read data from; and (ii) when it is determined that the possible WAR hazard between the later rendering job and the earlier rendering job can be safely ignored: permit the graphics processor to start processing the second, later rendering job.

The technology described herein relates generally to the operation of a graphics processor when performing a sequence of rendering jobs, in particular in the situation where there may be certain data (processing) dependencies between different rendering jobs in the sequence of rendering jobs that is being performed.

For instance, the graphics processor may be, and in an embodiment is, operable and configured to perform a sequence of render passes, wherein each render pass in the sequence of render passes is associated with, and generates, a respective output. Each render pass may in turn comprise one or more rendering jobs for processing (part of) the respective output for the render pass.

As mentioned above, however, the output for a given render pass may be a "final" output, e.g. a frame for display, but may also be an "intermediate" output (e.g. a "render to texture" output) that is then used by a later render pass in the sequence of render passes for generating its output. Likewise, the processing of a particular "final" output, e.g. frame, may in some cases re-use (at least some) processing of an earlier "final" output (e.g. frame). Thus, there may be certain data (processing) dependencies that should be enforced between rendering jobs for different render passes. Likewise, there may be certain data (processing) dependencies that should be enforced between different rendering jobs within the same render pass, e.g. where a "compute" job relates to an output produced by a preceding fragment rendering job, for instance, such that the "compute" job uses the data generated by the fragment rendering job. The technology described herein particularly relates to such situations where there are possible data (processing) dependencies between rendering jobs that may need to be enforced.

Each of the rendering jobs in the sequence of rendering jobs being performed in the technology described herein can be (and is) subdivided into a respective set of rendering tasks that is to be processed for an overall output (render target) for the render pass for which the rendering job is being performed for. For example, a render pass may, and generally will, include one or more fragment rendering jobs for producing a respective render output (e.g. frame) for the render pass, wherein the rendering tasks within a fragment rendering job generate respective portions (e.g. regions) of the overall output (frame). However, a particular render pass may also include various other types of rendering jobs such as "compute" jobs for performing calculations in respect of the (same) render output produced by a previous fragment rendering job within the same render pass (and wherein the rendering tasks for "compute" job may therefore, and in an embodiment do, perform such calculations in respect of certain portions (e.g. regions) of the overall output (render target)). That is, the rendering jobs within a given render pass may, and generally do, relate to the same overall output (e.g. frame), and the rendering tasks within each rendering job therefore in an embodiment relate to rendering operations (e.g. fragment shading in the case of a fragment shading job, or calculations in the case of a "compute" job) performed in respect of the same overall output for the render pass.

The graphics processor includes a set of one or more, and in an embodiment plural, processing (shader) cores that are operable to and configured to process these rendering tasks for the overall output (render target) for the rendering job. In embodiments, at least some, and in some cases all, of the rendering jobs, comprise a plurality of rendering tasks, which plural rendering tasks for the rendering job can be performed separately, e.g., and in an embodiment, in parallel across plural processing (shader) cores of the graphics processor. Each rendering task associated with a respective rendering job may therefore, and in an embodiment does, correspond to a respective portion of the overall output (render target) for the rendering job. Each rendering task thus in an embodiment corresponds to a respective instance of a graphics processing workload that can be (and is to be) executed by a respective processing (shader) core of the graphics processor.

Thus, the data (processing) dependencies between rendering tasks for different rendering jobs will typically (and in an embodiment) relate to only a portion of the overall output (e.g. the dependencies that can be handled by the technology described herein are typically data (processing) dependencies relating to certain regions of an overall render output being generated). Thus, when a rendering task within a particular rendering job performs processing relating to a certain region of a render output (e.g. where the rendering task writes data to a particular location within a data buffer (render target) corresponding to that region), any rendering tasks for later rendering jobs that require data relating to that (same) region of the render output may then have a data (processing) dependency on the earlier rendering task that needs to be managed. (On the other hand the later rendering tasks may not have any data (processing) dependencies on earlier rendering tasks that relate strictly to different regions of the render output.)

For example, and in an embodiment, the output (render target) for each rendering job is subdivided into a plurality of rendering tasks each corresponding to a respective "tile" or sub-region into which the overall render output (e.g. frame) associated with the rendering job has been subdivided for rendering purposes, i.e. for a tile-based rendering system, such that the individual rendering tasks to be processed for a particular rendering job generate respective portions (e.g. sub-regions) of the overall output (render target) associated with the rendering job. Therefore, the rendering tasks into which the rendering job is subdivided may, e.g., and in an embodiment do, correspond to (individual) rendering tiles into which the output (render target) for the rendering job has been subdivided for rendering purposes (and any references herein to rendering "tasks" may in embodiments be taken to refer to rendering "tiles"). Various arrangements would however be possible for defining suitable sets of rendering tasks to be performed within a given rendering job for generating a respective output for that rendering job.

Thus, the graphics processing workload within a given rendering job may, and in an embodiment does, involve issuing a plurality of (separate) rendering tasks (e.g. tiles) for processing, with each rendering task generating a respective render output (which is a respective portion of an overall render output associated with the rendering job), which rendering tasks may then be processed, e.g. in parallel, by respective processing (shader) cores of the graphics processor. The respective output(s) for individual rendering tasks can then be, and in an embodiment are, stored in a suitable intermediate buffer (e.g. a tile buffer in a tile-based rendering system), and once the processing of a rendering task is finished, the (final) output (or outputs) of that rendering task can then be written out accordingly, e.g. to a respective data buffer (render target) that the rendering job writes to, at which point the processing of the rendering task is complete.

Once all of the rendering tasks for a rendering job have completed their processing, and the respective outputs been written out appropriately, the rendering job is thus finished.

The graphics processor then continues in this way for the next and further rendering jobs in the sequence of rendering jobs being performed until all of the rendering jobs in the sequence of rendering jobs have finished (or until the application requiring the graphics processing stops the current sequence of rendering jobs, e.g. to generate a different sequence of outputs (e.g. frames).

The graphics processing workload for each render pass in a sequence of render passes being performed is therefore typically similar, with each render pass generally including a similar set of rendering jobs, and each rendering job including a similar set of rendering tasks to be performed (but with the different render passes producing different outputs (render targets)). The rendering tasks that are to be performed for a rendering job may be, and in an embodiment are, issued for processing in a set, e.g. predefined, order, but the processing of the rendering tasks can be (and is) allocated to the available processing (shader) cores of the graphics processor appropriately so that at least some processing of different rendering tasks is performed concurrently, e.g. in parallel, across the available processing (shader) cores. In general, the time to completion for different rendering tasks may be different and so the rendering tasks for different rendering jobs (for different render passes) may therefore complete out of order.

The allocation of rendering tasks to processing cores may thus be, and in an embodiment is, generally performed to try to balance the processing between the available processing (shader) cores of the graphics processor, and ensure higher utility of the available processing (shader) cores. Thus, a suitable task issuing circuit (task iterator) of the graphics processor may suitably control the scheduling and allocation of rendering tasks to processing (shader) cores in order to try to allocate rendering tasks to available processing (shader) cores, and hence increase utilisation of the processing (shader) cores.

However, the present Applicants recognise that there may still be instances within a particular render pass, or rendering job within a render pass, where there may be relatively lower utilisation of the available processing (shader) cores.

For example, this may particularly the case towards the end of a rendering job where there may be relatively fewer rendering tasks remaining to be completed for the rendering job compared to the number of available processing (shader) cores. Similar situations can also exist at the start of the rendering job where the workload may be focussed in the fragment "frontend", without requiring full processing (shader) core utilisation. Other situations of possible low processing (shader) core utilisation may include, for example, where the rendering job is itself relatively smaller and does not include enough rendering tasks to fully utilise all of the available processing (shader) cores.

A 'rendering job' is thus a self-contained chunk of processing work including one or more rendering tasks relating to a particular render output and there may be certain data (processing) dependencies between different rendering jobs in a sequence of rendering jobs that is being performed. A rendering job may however be part of a larger 'render pass' that comprises a plurality of different types of rendering jobs relating to the same render output. As mentioned above, the data (processing) dependencies between rendering jobs may therefore be data (processing) dependencies that exist between rendering jobs for different render passes, but could also be data (processing) dependencies between rendering jobs within the same render pass.

In some more traditional graphics processing arrangements a strict (hard) processing barrier is therefore enforced between such rendering jobs such that no rendering tasks for a later processing job are issued for processing until all of the rendering tasks for an earlier processing job on which it depends have completed their processing, e.g. in case there are any potential data (processing) dependencies between the rendering jobs that need to be enforced, for example where a rendering job uses data generated by one or more previous rendering jobs.

Thus, if the rendering jobs in the sequence of rendering jobs were performed strictly one-after-another, i.e. with strict (hard) processing barriers between different rendering jobs, and hence no overlap between the processing of different rendering jobs in the processing (shader) cores (as may be done in some more traditional graphics processing arrangements), there may be significant instances of relatively lower processing (shader) core utilisation, e.g., and in particular, where the graphics processor is finishing off processing for an earlier rendering job but can't yet start to issue and processing rendering tasks for a subsequent rendering job due to the strict processing barrier between the rendering jobs.

To address this, and provide an improved graphics processor performance, embodiments of the technology described herein thus provide a novel mechanism to safely allow processing for separate rendering jobs to overlap in the graphics processor processing (shader) cores, i.e. such that rendering tasks for different rendering jobs are able to run concurrently. For example, and in some embodiments of the technology described herein, rendering tasks for different rendering jobs are able to run concurrently (e.g. in parallel) across different processing (shader) cores of the graphics processor.

In some embodiments, the graphics processor may be configured such a particular processing (shader) core can only execute rendering tasks from a single fragment context (i.e. rendering job). In that case, when separate rendering job (potentially for separate render passes) are to be overlapped in the manner of the technology described herein, the rendering tasks from different rendering jobs may be (and will be) issued to different processing (shader) cores for processing. However, in general, rendering tasks for different rendering jobs could also run concurrently within the same processing (shader) core, e.g. so long as the graphics processor is appropriately configured with a mechanism to guarantee forward progress of the earlier rendering job so that any potential data (processing) dependencies can be suitably resolved. Various arrangements would be possible in this regard.

Because the graphics processor is operable to process rendering tasks for separate rendering jobs concurrently, this then means that the graphics processor (task issuing circuit) can start to issue rendering tasks for a second, later rendering job in a sequence of rendering jobs being performed for processing, and the processing (shader) cores can start processing those rendering tasks, without having to wait for all of the rendering tasks for the first rendering job to have completed their processing. Thus, the technology described herein advantageously avoids a strict (hard) processing barrier between separate rendering jobs.

Thus, as will be explained further below, the graphics processor of the technology described herein is in an embodiment operable and configured to permit rendering tasks for different rendering jobs to be processed concurrently, i.e. without necessarily enforcing a strict (hard) processing barrier between separate rendering jobs. Thus, in embodiments, the graphics processor is generally operable and configured to permit a set of one or more processing cores of the graphics processor to process rendering tasks for different rendering jobs concurrently such that processing for separate rendering jobs may overlap within the graphics processor processing (shader) cores, with any data (processing) dependencies between rendering tasks for the different rendering jobs being enforced by the graphics processor (hardware), e.g. within the graphics processor processing (shader) cores. This can then avoid a strict (hard) processing barrier between different rendering jobs, and hence provide an improved graphics processor performance, e.g., and in particular, in terms of speed and average processing (shader) core utilisation.

As will be explained further below, in embodiments, this operation generally relies on tracking the 'completion status' of rendering tasks for different rendering jobs, such that when potential data (processing) dependencies are identified between respective rendering tasks from different rendering jobs that may be being performed concurrently, the processing of the rendering tasks for the later rendering job can be (and in an embodiment is) controlled accordingly based on the completion status of the rendering tasks for the earlier rendering job on which its processing depends to enforce the dependency, e.g. by stalling at least some processing of the rendering task for the later rendering job, as needed.

This approach where data (processing) dependencies are enforced by the graphics processor (hardware), in particular tracking a completion status of rendering tasks for respective rendering jobs, can generally work well at least for certain types of data (processing) dependencies, for example, 'read-after-write' or 'write-after-write' dependencies where it can generally be determined during run-time, e.g. when a particular rendering task is to be processed for a later rendering job, which of the rendering task or tasks (if any) for an earlier rendering job that is still being performed using one or more of the graphics processor processing cores the rendering task potentially depends on, and to then control the processing of the rendering task for the later rendering job appropriately to enforce the dependency (if needed).

However, the present Applicants have recognised that there may be some situations or other types of data (processing) dependencies where this approach does not work, and so it may generally be needed to fall back to enforcing a stricter (harder) processing barrier between rendering jobs, e.g. in order to ensure a safe (artefact-free) graphics processing operation. This stricter (harder) processing barrier could for instance be a strict (hard) processing barrier that means that rendering tasks for the later (dependent) rendering job are not issued for processing until all of the rendering tasks for the earlier rendering job has completed. However, it would also be possible to still issue rendering tasks for the later (dependent) rendering job for processing, so long as a suitable processing barrier is enforced to control (e.g. stall) the memory access affected by the dependency.

A particular example of this would be in the case where a rendering task for a later rendering job in a sequence of render passes may potentially write to a data buffer (render target) that needs to be read from by an earlier rendering job in the sequence of render passes (a so-called 'write-after-read' ("WAR") dependency). This is because the number of data buffers (render targets) that the earlier rendering job may potentially have read from is essentially unbounded (and it is not typically mandated that this is declared up-front). Thus, in the case where a later rendering job in a sequence of rendering jobs being performed has a WAR dependency on an earlier rendering job in the sequence of rendering jobs, it may not generally be possible for the graphics processor itself to determine during run-time, e.g. when processing a particular rendering task for the later rendering job, which of the rendering tasks for the earlier rendering job the processing of the later rendering job depends.

Thus, in the case of a WAR dependency, to ensure safe (artefact-free) graphics processor operation, the rendering task for the later rendering job should not generally be processed to completion until all of the rendering tasks for the earlier rendering job on which it has a WAR dependency have completed their processing, i.e. such that a stricter (harder) processing barrier should therefore be (and in an embodiment is) enforced between the rendering jobs so that at least the processing for the later rendering job that potentially writes over data that may be needed by the earlier rendering job is stalled until the earlier rendering job is completed. Thus, the improved graphics processor operation where separate rendering jobs can be performed concurrently may not be able to handle such WAR dependencies, and may need to be disabled.

(It will be appreciated that this may be a particular problem that needs to be handled in the context of such a graphics processor that is configured and operable to permit separate rendering jobs to run concurrently. For example, in more traditional arrangements where the rendering jobs in a sequence of rendering jobs are performed strictly one-after-another, i.e. with strict (hard) processing barriers between different rendering jobs, any data (processing) dependencies that may exist, including WAR dependencies, may be (and are) enforced in the same way.)

It is also not generally possible to track such WAR dependencies on the host processor (CPU) side since different rendering jobs may be, and typically will be, submitted to the graphics processor from different command buffers and can be submitted to the graphics processor in any order, such that the host processor (CPU) will typically not be able to determine which data buffers (render targets) may be accessed by any rendering jobs other than those which it is currently preparing commands for.

The present Applicants recognise, however, that it may be possible to detect possible WAR hazards by identifying instances where the memory access permissions change between the rendering jobs from a readable state to a writeable state (i.e. there is a so-called 'layout transition'). This can be done on the host processor (CPU) side, e.g., and in an embodiment, by a driver for the graphics processor). Thus, although the host processor (CPU) (e.g. or a driver thereof) is generally not able to determine whether or not there is an actual WAR dependency for any of the particular data buffers to be accessed by the rendering jobs (i.e. since the host processor (CPU) (e.g. driver) will typically only have information as to the data buffers the rendering job it is currently preparing commands for will access), by identifying such 'layout transitions' the host processor (CPU) may be able to identify instances of possible WAR dependencies, and this possibility of a WAR dependency can be communicated accordingly to the graphics processor. As will be explained further below, the graphics processor can then be operated accordingly to ensure safe (artefact-free) graphics processing operation (and the technology described herein facilitates this).

(Conversely, if there is a layout transition from a (strictly) 'writeable' state to a 'readable' state, for example, this can also be detected, but in that case no special action may be required since the graphics processor, as mentioned above, may generally be configured and operable to handle 'read-after-write' or 'write-after-write' dependencies itself (and hence in that case the host processor (CPU) (e.g. driver) in an embodiment does not include any barrier commands to enforce the data (processing) dependency, but this is instead done by the graphics processor (hardware), e.g. as will be described further below).)

An aspect of the technology described herein, therefore, is the recognition that it may be possible for the host processor (CPU) (e.g. driver) when preparing command streams for the graphics processor to detect possible WAR hazards by identifying changes in memory access permissions, and to then provide a suitable indication of this to the graphics processor, e.g. within the command stream, e.g., and in an embodiment, by inserting an appropriate barrier command into the command stream (as will be described further below). The indication that is provided to the graphics processor is thus usable (and used) by the graphics processor when processing the command streams prepared by the host processor to control subsequent operation of the graphics processor to enforce the possible WAR dependency (and hence to ensure safer (artefact-free) graphics processor operation).

In this respect it will be appreciated that the memory access permissions for a particular rendering job are typically set in advance, e.g. by the application programmer, and so can generally be detected by the host processor (CPU) (e.g. driver) when preparing the graphics processor command streams. In particular, according to the technology described herein, possible WAR hazards can be (and are) detected by identifying whether the memory access for the data buffer changes between the first and second rendering jobs from a state in which data can be read from the data buffer to a state in which data can be written to the data. For example, if the memory access permissions for a data buffer change from 'read-only' to 'write-only', this layout transition indicates that there is a possible 'write-after-read' hazard. Likewise, when the memory access permissions change from 'read-only' to 'read/write', or 'read/write' to 'write-only', this can also indicate possible 'write-after-read' hazards.

The indication that is provided by the host processor that there is a possible WAR hazard may generally take any suitable and desired form. In embodiments, the indication is included within the command stream associated with the later rendering job itself, e.g., before, e.g., and in an embodiment, immediately before, the commands to perform the later rendering job.

For example, in an embodiment, the indication is provided in the form of a 'possible WAR' barrier command that is included into the command stream and usable to enforce the possible WAR dependency relating to the earlier rendering job. When the graphics processor is executing from that command stream, in response to encountering such 'possible WAR' barrier command, this may then cause the graphics processor to enforce a stricter (harder) processing barrier, i.e. such that the graphics processor stalls at least some processing for the later rendering job until the earlier render pass has completed all of its processing (although as will be explained further below the graphics processor is in an embodiment further operable to ignore such processing barrier when it can determine that it is safe to do so, and a mechanism for this is provided).

(Of course, if the layout transitions were not defined in advance or it were otherwise not possible for the host processor (CPU) (e.g. driver) to identify such layout transitions when preparing a command stream it may then be desirable or necessary to conservatively enforce a stricter (harder) processing barrier to ensure safe graphics processing. This may also be the case for example where a data buffer (render target) remains in a mixed read/write state between rendering jobs. Again, this can be done in the same way, e.g. by the host processor (CPU) (e.g. driver) including a suitable 'possible WAR' barrier command into the graphics processor command stream that when executed can (and generally does) enforce a strict (hard) processing barrier between the render passes to which the 'possible WAR' barrier command relates.)

The technology described herein thus also extends to the operation of the host processor (CPU) itself when preparing commands for a graphics processor to perform a sequence of rendering jobs in this way.

A third embodiment of the technology described herein comprises a method of operating a host processor for a graphics processing system when preparing one or more command streams for a graphics processor, the method comprising:

the host processor:

when preparing one or more command streams for the graphics processor to perform a sequence of rendering jobs, wherein each rendering job in the sequence of rendering jobs is potentially operable to read data from or write data to one or more of a set of available data buffers according to a set of memory access conditions defined for the rendering job in question that define respective memory access permissions for the data buffers in the set of available data buffers:

(i) detecting possible write-after-read (WAR) hazards in which a later rendering job in the sequence of rendering jobs potentially writes to a data buffer that an earlier rendering job in the sequence of rendering jobs may need to read data from by identifying whether the memory access permissions for any of the data buffers in the set of available data buffers change between the earlier and later rendering jobs from a state in which data can be read from the data buffer to a state in which data can be written to the data buffer; and (ii) when a possible WAR hazard is detected between a second, later rendering job and a first, earlier rendering job in the sequence of rendering jobs to be performed, providing with the command stream associated with the second, later rendering job an indication that a possible WAR hazard has been detected relating to the first, earlier rendering job.

A fourth embodiment of the technology described herein comprises a host processor, the host processor comprising:

a command stream preparation circuit that is configured to:

when preparing one or more command streams for the graphics processor to perform a sequence of rendering jobs, wherein each rendering job in the sequence of rendering jobs is potentially operable to read data from or write data to one or more of a set of available data buffers according to a set of memory access conditions defined for the rendering job in question that define respective memory access permissions for the data buffers in the set of available data buffers:

(i) detect possible write-after-read (WAR) hazards in which a later rendering job in the sequence of rendering jobs potentially writes to a data buffer that an earlier rendering job in the sequence of rendering jobs may need to read data from by identifying whether the memory access permissions for any of the data buffers in the set of available data buffers change between the earlier and later rendering jobs from a state in which data can be read from the data buffer to a state in which data can be written to the data buffer; and (ii) when a possible WAR hazard is detected between a second, later rendering job and a first, earlier rendering job in the sequence of rendering jobs to be performed, provide with the command stream associated with the second, later rendering job an indication that a possible WAR hazard has been detected relating to the first, earlier rendering job.

As will be appreciated by those skilled in the art, these third and fourth embodiments of the technology described herein can, and in an embodiment do, include any one or more or all of the features of the technology described herein according to any of the embodiments described herein, as appropriate.

Thus, according to the technology described herein, the host processor (CPU) is configured and operable to detect possible WAR hazards when preparing a graphics processing command stream and to include suitable indications of this into the command stream, e.g., and in an embodiment, in the form of barrier commands (as mentioned above), to control the subsequent graphics processor operation to enforce the possible WAR dependency (as will be described further below).

In an embodiment this operation is performed by a driver for the graphics processor. For example, the driver will typically have information regarding the overall sequence of rendering jobs, and can thus identify possible WAR hazards. However, the driver will not typically be able to determine which data buffers (render targets) may be accessed by a given rendering job (other than the rendering job for which it is currently preparing commands), e.g. since different rendering jobs may, and typically will, reside in different command buffers on the host processor (CPU). Thus, the driver may generally only be able to detect 'possible' WAR hazards, but it will not generally be known until the later rendering job is processed whether there is any actual overlap in the data buffers (render targets), i.e. whether there is an actual WAR dependency.

In a simpler approach, therefore, a stricter (harder) processing barrier could be selectively enforced between rendering jobs whenever the host processor (CPU) (e.g. driver) identifies based on the memory access permissions (i.e. by identifying that there is a possible layout transition between rendering jobs from a potentially readable state to a potentially writeable state) that there is a possible WAR hazard (but without any further regard or attempt to determine as to whether the possible WAR hazard actually relates to any of the data buffers that will be accessed by the rendering jobs, i.e. whether there is an actual WAR dependency).

This simpler approach may of course still provide benefits, e.g., compared to always enforcing a strict (hard) processing barrier between rendering jobs, as in some more traditional approaches, as in this case a stricter (harder) processing barrier may only be enforced when such a possible WAR hazard is identified, but the strict (hard) processing barrier can still be (and is) removed for other types of data (processing) dependencies (e.g. 'read-after-write' dependencies, as mentioned above).

However, the present Applicants recognise that this simpler approach may therefore unnecessarily enforce a stricter (harder) processing barrier between rendering jobs when it would in fact be possible to perform the rendering jobs concurrently.

That is, the present Applicants have recognised that the simpler approach described above where a strict (hard) processing barrier is enforced whenever any layout transition is identified by the host processor (CPU) (e.g. driver) may miss opportunities where the performance of the graphics processor could be improved by permitting separate rendering jobs to run concurrently within the graphics processor processing (shader) cores. The present Applicants also recognise that the graphics processor itself may at least in some cases be able to determine whether or not a possible WAR hazard can (safely) be ignored.

As will be described further below, the technology described herein thus provides a mechanism to allow the graphics processor to ignore such processing barriers when the graphics processor can determine that it is definitely safe to do so.

The technology described herein at least in its embodiments therefore provides an improved mechanism for handling such WAR dependencies, i.e. where a second, later rendering job in the sequence of rendering jobs (potentially) writes to a data buffer that a first, earlier rendering job in the sequence of rendering jobs may need to read data from, that in an embodiment allows for a further determination as to whether a possible WAR hazard that has been identified within a sequence of rendering jobs (i.e. by the host processor (CPU) (e.g. driver)) actually affects any of the data buffers that will be accessed by the rendering jobs to which the possible WAR hazard relates, and hence whether or not a strict (hard) processing barrier needs to be (and hence should be) enforced between those rendering jobs. Thus, when the graphics processor is able to determine that there is definitely no overlap between the data buffers that will be accessed by the rendering jobs to which the possible WAR hazard relates, this means that the possible WAR hazard can be safely ignored, and the graphics processor is therefore operable to do so (e.g. by ignoring any barrier command associated with the possible WAR hazard).

Thus, as described above, the host processor in an embodiment detects possible WAR hazards by identifying whether the memory access permissions for the data buffer in question change between the rendering jobs from a state in which data can be read from the data buffer to a state in which data can be written to the data buffer (i.e. there is 'layout transition' for a data buffer that means that the later rendering job could potentially write to the same data buffer that an earlier rendering job may need to read from (i.e. such that there is a possibility of a WAR hazard that may need to be enforced)), e.g. as described above. This determination can then be (and in an embodiment is) made in respect of (each of) data buffers in the available set of data buffers.

For instance, each rendering job in the sequence of rendering jobs is potentially operable to read data from or write data to one or more of a set of available data buffers according to a set of memory access conditions defined for the rendering job in question that define respective memory access permissions for the data buffers in the set of available data buffers. The memory access conditions may thus, for example, define that a particular data buffer is 'read-only', 'write-only', 'read-and-write', etc., Thus, when the memory access conditions for a given data buffer change between render passes from 'read-only' to 'write-only', for example, this indicates that there may be a possible 'write-after-read' dependency.

The host processor then provides a suitable indication that there is a possible WAR hazard to the graphics processor, e.g., and in an embodiment, by including within the command stream associated with the later render pass a suitable barrier command.

As mentioned above, in a simpler approach, the graphics processor could be operated to always enforce a stricter (harder) processing barrier between the render passes whenever it is detected that there is any such layout transition between rendering jobs (i.e. without taking into account whether the possible WAR hazard actually affects any of the data buffers that will be accessed by the rendering jobs to which the possible WAR hazard relates).

In an embodiment, however, the graphics processor according to the technology described herein, in response to encountering an indication that there is a possible WAR hazard between a later render pass and an earlier render pass in a sequence of render passes being performed (e.g. in response to encountering the WAR barrier command), further determines whether the possible WAR hazard relates to any of the data buffers that may actually be accessed by the later rendering job. If not, then the graphics processor can determine that the possible WAR hazard can safely be ignored, and is thus in an embodiment configured to do so, i.e. by starting processing of the later rendering job without waiting for the earlier rendering job to which the possible WAR hazard relates to have completed all of its processing.

Thus, rather than simply enforcing a stricter (harder) processing barrier whenever the host processor (CPU) (e.g. driver) detects such a layout transition from a readable state to a writeable state in respect of the any of the available data buffers, the graphics processor of the technology described herein in an embodiment further determines whether or not the WAR hazard potentially relates to any of the data buffers that will be accessed by the rendering jobs and in an embodiment only enforces a strict (hard) processing barrier between rendering jobs when the WAR hazard possibly relates to data buffers that may actually be accessed by the render passes in question.

That is, it is in an embodiment further determined (by the graphics processor) whether the second, later rendering job in the sequence of rendering jobs potentially writes data to any data buffer that the first, earlier rendering job in the sequence of rendering jobs may need to read data from, i.e. whether or not there is any overlap between the data buffers that may be accessed by the different rendering jobs, and only when there is a potential overlap between the data buffers does the 'write-after-read' hazard need to be managed, e.g. by stalling at least some processing of the later rendering job as needed to enforce a stricter (harder) processing barrier between the rendering jobs.

The technology described herein also extends to the operation of the graphics processor (and a graphics processor itself) when performing a sequence of rendering jobs in this way.

A fifth embodiment of the technology described herein comprises a method of operating a graphics processor when processing one or more command streams to perform a sequence of rendering jobs, wherein each rendering job in the sequence of rendering jobs is potentially operable to read data from or write data to one or more of a set of available data buffers according to a set of memory access conditions defined for the rendering job in question that define respective memory access permissions for the data buffers in the set of available data buffers, the method comprising:

in response to encountering in a command steam an indication that there is a possible write-after-read (WAR) hazard between a second, later rendering job and a first, earlier rendering job in the sequence of rendering jobs:

(i) determining whether the possible WAR hazard can be safely ignored by determining whether there is any potential overlap in the set of available data buffers between the data buffers that the second, later rendering job potentially writes to and the data buffers that the first, earlier rendering job may need to read data from; and (ii) when it is determined that the possible WAR hazard between the second, later rendering job and the first, earlier rendering job can be safely ignored: permitting the graphics processor to start processing the second, later rendering job.

A sixth embodiment of the technology described herein comprises a graphics processor, the graphics processor including:

a command stream processing circuit; and a control circuit, the control circuit configured to:

when the command stream processing circuit is processing one or more command streams to perform a sequence of rendering jobs, wherein each rendering job in the sequence of rendering jobs is potentially operable to read data from or write data to one or more of a set of available data buffers according to a set of memory access conditions defined for the rendering job in question that define respective memory access permissions for the data buffers in the set of available data buffers:

in response to the command stream processing circuit encountering in a command steam an indication that there is a possible write-after-read (WAR) hazard between a second, later rendering job and a first, earlier rendering job in the sequence of rendering jobs:

(i) determine whether the possible WAR hazard can be safely ignored by determining whether there is any potential overlap in the set of available data buffers between the data buffers that the second, later rendering job potentially writes to and the data buffers that the first, earlier rendering job may need to read data from; and (ii) when it is determined that the possible WAR hazard between the second, later rendering job and the first, earlier rendering job can be safely ignored: permit the command stream processing circuit of the graphics processor to start issuing processing jobs for the second, later rendering job for processing.

Thus, according to the fifth and sixth embodiments of the technology described herein the graphics processor in response to encountering in a command steam an indication that there is a possible WAR hazard is operable and configured to then further determine whether the possible WAR hazard can safely be ignored. This is done, as described above, by the graphics processor determining whether there is potential overlap in the set of available data buffers between the data buffers that the second, later rendering job potentially writes to and the data buffers that the first, earlier rendering job may need to read data from.

Thus, the determining whether there is potential overlap in the set of available data buffers between the data buffers that the second, later rendering job potentially writes to and the data buffers that the first, earlier rendering job may need to read data from, and hence the determining as to whether the WAR hazard may be ignored, is in an embodiment triggered by the indications (e.g. barrier commands) provided to the graphics processor by the host processor (CPU) (e.g. driver) with the graphics processor command streams (s).

As will be appreciated by those skilled in the art, these fifth and sixth embodiments of the technology described herein can, and in an embodiment do, include any one or more or all of the features of the technology described herein according to any of the embodiments described herein, as appropriate.

Thus, in an embodiment, also according to the fifth and sixth embodiments of the technology described herein, as described above in relation to the other embodiments of the technology described herein, the determining whether the possible WAR hazard can be safely ignored is in an embodiment performed in response to a command stream processing circuit (e.g. command stream frontend/job manager) of the graphics processor encountering in a command stream an indication that there is a possible WAR hazard that has been provided with the command stream by the host processor (CPU) (e.g. driver) (but wherein the initial identifying that there is a possibility of a WAR hazard is performed by the host processor (CPU) (e.g. driver), e.g. in the manner described above, with the host processor (CPU) then providing the indication of this to the graphics processor (e.g., and in an embodiment, by inserting a 'possible WAR' barrier command into the command stream)).

Thus, when the graphics processor can determine that a possible WAR hazard between a second, later rendering job and a first, earlier rendering job can be safely ignored: the graphics processor is then permitted to start processing the second, later rendering job, e.g., and in an embodiment, without enforcing a stricter (harder) processing barrier, and hence without waiting for the first, earlier rendering job to have completed some or all of its processing. In other words, the graphics processor can ignore the processing barrier when it can determine it is safe to do so, e.g., and in an embodiment, such that the command stream processing circuit (command stream frontend/job manager) can start processing rendering tasks for the later rendering job without waiting for the earlier rendering job to finish.

In this way, the managing of such WAR hazards can be (and in an embodiment is) performed in a more controlled manner allowing increased possibilities for improved graphics processor performance by only enforcing a stricter (harder) processing barrier between the rendering jobs when it is necessary to do so (i.e. when it cannot be definitely determined that it is safe to ignore the stricter (harder) processing barrier), hence increasing the possibility for separate rendering jobs to be run concurrently when it can be determined that it is in fact possible (i.e. safe) to do so.

The determining whether the possible WAR hazard can be safely ignored by determining whether there is any potential overlap in the set of available data buffers between the data buffers that the second, later rendering job potentially writes to and the data buffers that the first, earlier rendering job may need to read data from may be performed in various suitable manners, as desired.

For instance, in some embodiments, this could be done by explicitly checking for each of the available data buffers whether or not there is any potential overlap between the data buffers that the second, later rendering job potentially writes to and the data buffers that the first, earlier rendering job may need to read data from. Thus, an appropriate data structure (e.g. a bitmap) may be associated with each rendering job indicating which of the available data buffers are potentially accessed by that rendering job and a comparison can then be made between the rendering jobs using such data structures.

In this way, it is then possible to more accurately determine whether or not the possible WAR hazard can be ignored. However, this approach may introduce significant processing overhead, e.g. since the data structures required in this case may be relatively larger, such that the data structures may typically have to be stored in (main) memory, with multiple load/store operations then being required in order to access the data structures.

Thus, whilst this approach may allow for a more precise determination as to whether the possible WAR hazard can be ignored, this is at the cost of potentially adding many extra processing cycles, thus potentially reducing the benefit of being able to run rendering jobs concurrently.

Therefore, in embodiments, rather than attempting to check whether there is any possible overlap for each available data buffer, the determining whether the possible WAR hazard can be safely ignored by determining whether there is any potential overlap in the set of available data buffers between the data buffers that the second, later rendering job potentially writes to and the data buffers that the first, earlier rendering job may need to read data from is instead performed using a probabilistic data structure that is able to allow checking if an element is part of a set with no false negatives (which probabilistic data structure may, e.g., be, and in an embodiment is, in the form of an approximate membership query filter, such as a Bloom filter, as will be described below). That is, rather than attempting to make an exact determination, the determination is in an embodiment made in a probabilistic manner, in particular such that the determination is as to whether there is "possibly overlap" (but with some probability of false positives) or "definitely no overlap" (i.e. the determination is made such that there is no possibility of false negatives).

The use of such a probabilistic data structure thus allows the graphics processor to check whether any data buffers (render targets) that a second, later rendering job writes to potentially overlap with any data buffers (render targets) that first rendering job may need to read from, and if there is any possible overlap, the second, later rendering job can then be (and is) stalled appropriately.

On the other hand, if (and only if) it can be determined that there is definitely no overlap can the WAR hazard safely be ignored, in which case the graphics processor can then start to process the second, later rendering job relatively earlier, e.g. without waiting for the first, earlier rendering job to complete its processing.

Thus, in an embodiment, the determining whether the possible WAR hazard can be safely ignored by determining whether there is any potential overlap in the set of available data buffers between the data buffers that the second, later rendering job potentially writes to and the data buffers that the first, earlier rendering job may need to read data from is performed using a probabilistic data structure that indicates whether there is a possible overlap between the data buffers that may be accessed the different rendering jobs, such that there may be false positives, but wherein the probabilistic data structure is configured such that there is no possibility of false negatives (i.e. there is a possibility when using the probabilistic data structure that it may be determined that there is possible overlap between the data buffers that may be accessed the different rendering jobs even when there is no actual overlap, and so a strict (hard) processing barrier may be enforced when it is not in fact required to do so, but there is no possibility on the other hand of determining that there is no overlap between the data buffers that may be accessed the different rendering jobs when there is actually an overlap).

In this respect, it will be appreciated that false positives are generally acceptable, as enforcing a strict (hard) processing barrier when it is not necessary to do so may simply reduce performance slightly. On the other hand, false negatives may cause artefacts as it is not generally safe to perform separate rendering jobs concurrently where such WAR hazards exist, and so if it cannot be definitely determined that there is no overlap, a strict (hard) processing barrier should be enforced (and this is therefore done).

The effect of this is then that a safe (artefact-free) operation is still ensured as any potential WAR hazards can be handled appropriately, but the handling is performed in a more controlled manner to allow increased possibility for separate rendering jobs to be performed concurrently when it can be determined that it is possible to do so.

Further, by using a probabilistic data structure to indicate a likelihood that there is overlap between data buffers, as described above, (rather than trying to explicitly store determinations for each individual data buffer to allow the overlap to be determined exactly) this in an embodiment then allows the WAR hazard handling to be performed by the graphics processor in a relatively efficient manner, e.g. without requiring significant additional processing overhead or silicon area, as the probabilistic data structure can have a fixed size and can be made relatively smaller, e.g., and in an embodiment, such that it can be stored locally to the graphics processor.

For example, in embodiments, the probabilistic data structure that is used to detect overlap comprises an 'approximate set membership query filter' that is configured such that the approximate set membership query may falsely determine that there is overlap between the data buffers used by the different rendering jobs even when no such overlap exists but will never falsely determine that there is no overlap between the data buffers used by the different rendering jobs when such overlap does exist (i.e. there are no false negatives).

Thus, in embodiments, determining that the second, later rendering job in the sequence of rendering jobs potentially writes data to any data buffer that the first, earlier rendering job in the sequence of rendering jobs may need to read data from is performed by identifying whether there is any potential overlap between the data buffers that are potentially written to by the second, later rendering job and the data buffers that the first, earlier rendering job may need to read data from. In that case, identifying whether there is any potential overlap between the data buffers that are potentially written to by the second, later rendering job and the data buffers that the first, earlier rendering job may need to read data from is in an embodiment performed using a probabilistic data structure, such as an approximate set membership query filter.

Subject to the particular requirements of the technology described herein, any suitable approximate set membership query filter that can be (and is) configured such that the approximate set membership query may falsely determine that there is overlap between the data buffers used by the different rendering jobs even when no such overlap exists but will never falsely determine that there is no overlap between the data buffers used by the different rendering jobs when such overlap does exist may be used in this regard.

For example, and in particular embodiments, the approximate set membership query filter may comprise a Bloom filter. A Bloom filter is essentially a bit mask with the bits that are set being defined based on one or more hash functions computed over the set. The present Applicants recognise in this regard that a Bloom filter may be a particularly space-efficient probabilistic data structure that can be used to test whether an element is a member of a set and is able to return a result either that the member is "possibly in the set" or "definitely not in the set". A Bloom filter may therefore be particularly suited for the purposes of the technology described herein. However, various other suitable approximate set membership query structures exist that may also be suitable in this regard.

In general, and in an embodiment, the approximate set membership query filter may therefore use one or more hash function to implement the approximate set membership query filter (and this is the case for a Bloom filter, for example, where a hash function is used to determine which bits in the Bloom filter should be set).

Thus, in an embodiment, each data buffer in the set of available data buffers may have a unique identifier, and a suitable hash function can thus be computed for each rendering job indicating which of the data buffers in the set of available data buffers are potentially accessed by that rendering job.

Thus, for example, whenever a layout transition is identified between rendering jobs that indicates that a later rendering job has a possible WAR dependency on an earlier (e.g. the current rendering job) (i.e. a possible WAR hazard is detected) (which WAR hazard detection is in an embodiment performed by a driver for the graphics processor, as mentioned above), a suitable hash or set of hashes can then be computed based on the data buffers in the set of available data buffers are potentially accessed (i.e. read from) by the earlier rendering job (with this hash in an embodiment being computed so as to implement an approximate set membership query filter, e.g. a Bloom filter).

The approximate set membership query filter computed using the hash thus reflects which data buffers in the set of available data buffers are potentially accessed (i.e. read from) by that rendering job. A similar set of hashes may thus be computed for the next (potentially dependent) rendering job for each of the data buffers in the set of available data buffers that can potentially be written-to by the later rendering job. A suitable comparison can thus be made based on the approximate set membership query filters (i.e. the computed hashes) to determine whether or not there is potential overlap in the data buffers used by the rendering jobs. In particular, as described above, the approximate set membership query filter is in an embodiment computed in such a way that the comparison cannot result in false negatives, i.e. such that the comparison is able to determine if there is definitely no overlap between data buffers, but may result in some false positives, where it cannot be determined that there is definitely is overlap (and this is the desired behaviour for ensuring safer (artefact-free) graphics processor operation).

For example, and in an embodiment, the respective hashes for each potentially written-to data buffer (render target) can then be (and are) compared to the approximate set membership query filter calculated for the earlier rendering job to which the possible WAR hazard relates to determine whether or not there is potential overlap in the data buffers used by the rendering jobs.

Various arrangements would however be possible in this regard.

As alluded to above, the effect and benefit of using an approximate set membership query filter, such as a Bloom filter, is that the data structure that is stored can be relatively smaller, e.g., and in an embodiment, fixed-size, e.g. with the size depending on the desired false positive rate (i.e. the level of false positives that may be acceptable). In this respect, note that the smaller the data structure that is used for the approximate set membership query filter, the greater the risk of false positives. However, the present Applicants have found that for a Bloom filter, fewer than 10 bits per element are typically required for a false positive rate of 1%. Thus, this can be implemented relatively efficiently, whilst still providing good performance. In this respect, it is also noted that 'write-after-read' layout transitions are typically relatively rare and so the larger benefits of reducing the area costs means that it is generally worth accepting some degree of false positives.

For example, as also mentioned above, the approximate set membership query filter can be, and in an embodiment is, stored and checked locally to the graphics processor, e.g., and in an embodiment, within a command stream processing circuit (e.g. the command stream frontend/job manager) of the graphics processor.

Thus, in embodiments, as mentioned above, the host processor (CPU) when preparing commands for the graphics processor for a rendering job may therefore compute a first value (e.g. by computing one or more hash) for the approximate set membership query filter based on the data buffers that are accessed for that rendering job. This may be done, for example, by a driver for the graphics processor, e.g., and in an embodiment, in response to the driver identifying a layout transition that indicates a possible WAR hazard.

When the commands are issued to the graphics processor command stream processing circuit (command stream frontend/job manager) the first value (the approximate set membership query filter) may then be stored appropriately, e.g. for subsequent use.

A subsequent rendering job will have a corresponding set of one or more hashes calculated by the host processor (CPU) (e.g. a driver thereof) before it is issued to the graphics processor command stream processing circuit (command stream frontend/job manager). When the subsequent rendering job is issued to the graphics processor, the graphics processor command stream processing circuit (command stream frontend/job manager) can then compare the set of one or more hashes calculated for the later rendering job with the stored first value (i.e. the approximate set membership query filter) for the earlier rendering job to determine whether or not there is any potential overlap between the data buffers to be used by the rendering jobs, and hence whether any identified WAR dependency needs to be enforced (whereas if it can be determined that there is no definitely overlap between the data buffers (render targets) that will be accessed by the different rendering jobs to which a possible WAR hazard, the WAR dependency can be safely ignored).

In an embodiment, the approximate set membership query filter is stored in one or more registers of the command stream processing circuit (the command stream frontend/job manager), such that the checking of the approximate set membership query filter can then be (and in an embodiment is) performed using suitable register operations (e.g. MOVE operations), rather than having to go back to (main) memory. This can therefore provide a very efficient implementation without significant area cost and without introducing significant additional processing cycles (e.g. there is no need to introduce a multitude of LOAD/STORE operations as may be the case if the checking was performed using a data structure residing in (main) memory).

For instance, the command stream processing circuit (e.g. the command stream frontend/job manager) of the graphics processor in an embodiment interfaces with the host processor (e.g. CPU) that is submitting work to the graphics processor (e.g. via a suitable driver for the graphics processor).

The host processor (CPU) when preparing commands for the graphics processor for a rendering job may therefore compute a first value for the approximate set membership query filter based on the data buffers that are accessed for that rendering job. When the commands are issued to the graphics processor command stream processing circuit (command stream frontend/job manager) the first value may then be stored appropriately, e.g. using one or more registers accessible to the command stream processing circuit (command stream frontend/job manager).

The host processor (CPU) will do the same for the next rendering job. When the next rendering job is issued to the command stream processing circuit (command stream frontend/job manager), when a possible WAR hazard is detected, the host processor (CPU) can insert a suitable command indicating this, which command will then cause the graphics processor command stream processing circuit (command stream frontend/job manager) to perform appropriate an appropriate WAR hazard detection mechanism comprising comparing the respective value for the approximate set membership query filter for the later rendering job with the corresponding value for the approximate set membership query filter that is stored by the command stream processing circuit (command stream frontend/job manager) for the earlier rendering job to identify whether or not there is a potential overlap between the data buffers that are to be accessed, and hence whether or not a strict (hard) processing barrier needs to be enforced as a result of the identified WAR hazard.

Thus, the WAR hazard detection of the technology described herein is in an embodiment controlled within the graphics processor command stream processing circuit (command stream frontend/job manager) in particular by the driver including suitable commands into the command stream for the graphics processor to trigger such operation whenever the driver identifies a potential WAR hazard based on the memory access permissions. The graphics processor command stream processing circuit (command stream frontend/job manager) can thus generate, in respect of a given, earlier rendering job to be performed a suitable data structure for implementing the approximate membership query filter, which is then stored appropriately, e.g. using one or more registers accessible to the graphics processor command stream processing circuit (command stream frontend/job manager).

For example, in embodiments, in response to the driver identifying a layout transition that indicates a possible WAR hazard, the driver may then be operable to insert a suitable WAR barrier command into the command stream that is then used to trigger the control operations of the technology described herein. Thus, when the graphics processor (command stream processing circuit) encounters the WAR barrier command, this in an embodiment triggers the determining as to whether or not the WAR hazard can be safely ignored.

Thus, when the next, later rendering job is issued to the graphics processor, the graphics processor command stream processing circuit (command stream frontend/job manager) can calculate a corresponding data structure for implementing the approximate membership query filter which can then be (and is) checked against the data structure stored for the earlier rendering job to determine whether or not there is any potential overlap between the data buffers that are used. If the approximate membership query filter indicates there is possible overlap (i.e. it cannot be determined that there is definitely no overlap), a strict (hard) processing barrier should then be (and therefore is) enforced. On the other hand, only if it can be determined that there is definitely no overlap between the data buffers can the possible WAR hazard be ignored and processing of the rendering jobs permitted to overlap (e.g. within the graphics processor processing (shader) cores).

Thus, the use of a probabilistic data structure according to the embodiments of the technology described herein can provide a very efficient mechanism for handling possible WAR hazards by enforcing appropriate processing barriers when it is necessary to do, whilst still permitting the graphics processor to (otherwise) permit separate rendering jobs to be performed concurrently when it can be determined that it is safe to do, thus improving the graphics processor operation. Further, this can all be, and in an embodiment is, implemented within the graphics processor command stream processing circuit (command stream frontend/job manager) so that this operation can be performed locally to the graphics processor, e.g. without requiring significant increased memory bandwidth or processing cycles.

The technology described herein can therefore provide various benefits compared to other possible approaches.

The present Applicants believe that the concept of using a probabilistic data structure to determine whether there is possible overlap between data buffers for different rendering jobs, and hence whether a potential data (processing) dependency needs to be enforced between the rendering jobs, may also be novel and inventive in its own right. For example, whilst this may provide a particularly efficient mechanism for identifying so-called 'write-after-read' dependencies, e.g. within the graphics processor command stream frontend, as described above, it will be appreciated that the graphics processor may also need to make similar determinations for other potential data (processing) dependencies.

In particular, and as will be described below, where there are 'read-after-write' (or 'write-after-write') dependencies between rendering jobs, in that case it may generally be safe to issue rendering tasks for processing concurrently, so long as a mechanism is provided to enforce such data (processing) dependencies as needed within the graphics processor (e.g. within the graphics processor processing (shader) cores). That is, in such cases, the processing barrier may be, and in an embodiment is, moved within the graphics processor hardware. In these cases there is therefore also a need to identify whether or not such data (processing) dependencies actually exist, in particular by determining whether or not the read/write operations to be performed for the different rendering jobs potentially relate to the same data buffers. Again, therefore, this determination can be done using a probabilistic data structure, in the manner described above. In this case, however, the detecting may be performed within the graphics processor graphics processing pipeline, e.g. by a task issuing circuit (task iterator) of the graphics processor and/or by a 'task completion status' checking circuit within a processing (shader) core of the graphics processor (this will be described further below).

Thus, according to another embodiment of the technology described herein there is provided a method of operating a graphics processor when performing a sequence of rendering jobs, wherein the graphics processor is configured such that a set of one or more processing cores of the graphics processor is operable to process rendering tasks for different rendering jobs concurrently, the method comprising:

when performing a sequence of rendering jobs, wherein each rendering job in the sequence of rendering jobs is potentially operable to read data from or write data to one or more of a set of available data buffers according to a set of memory access conditions defined for the rendering job in question that define respective memory access permissions for the data buffers in the set of available data buffers:

determining whether a second, later rendering job in the sequence of rendering jobs potentially depends on a first, earlier rendering job in the sequence of rendering jobs by identifying whether there is potential overlap between the data buffers that are to be accessed by the second rendering job and the data buffers that are to be accessed by the first rendering job; and when it is detected that the second, later rendering job in the sequence of rendering jobs potentially depends on the first, earlier rendering job in the sequence of rendering jobs: controlling processing of the second, later rendering job to enforce the dependency.

According to a yet further embodiment of the technology described herein there is provided a graphics processor, the graphics processor comprising a control circuit configured to:

when the graphics processor is performing a sequence of rendering jobs, wherein each rendering job in the sequence of rendering jobs is potentially operable to read data from or write data to one or more of a set of available data buffers according to a set of memory access conditions defined for the rendering job in question that define respective memory access permissions for the data buffers in the set of available data buffers:

determine whether a second, later rendering job in the sequence of rendering jobs potentially depends on a first, earlier rendering job in the sequence of rendering jobs by identifying whether there is potential overlap between the data buffers that are to be accessed by the second rendering job and the data buffers that are to be accessed by the first rendering job; and when it is detected that the second, later rendering job in the sequence of rendering jobs potentially depends on the first, earlier rendering job in the sequence of rendering jobs: control processing of the second, later rendering job to enforce the dependency.

As will be appreciated by those skilled in the art, these additional embodiments of the technology described herein can, and in an embodiment do, include any one or more or all of the features of the technology described herein described herein, as appropriate.

For example, and in particular, the identifying whether there is potential overlap between the data buffers that are to be accessed by the second rendering job and the data buffers that are to be accessed by the first rendering job is in an embodiment performed using a probabilistic data structure, and in an embodiment using an approximate set membership query filter (such as a Bloom filter), e.g. as described above. Thus, in the same manner described above in relation to the earlier embodiments of the technology described herein, the determining whether a second, later rendering job in the sequence of rendering jobs potentially depends on a first, earlier rendering job in the sequence of rendering jobs by identifying whether there is potential overlap between the data buffers that are to be accessed by the second rendering job and the data buffers that are to be accessed by the first rendering job in an embodiment uses a suitable approximate set membership query filter (such as a Bloom filter), and in an embodiment involves computing respective hashes over the respective sets of data buffers (render targets) that will be accessed by the different rendering jobs in order to determine whether there is any possible overlap.

Again, in this case, the approximate set membership query filter should be (and is) configured such that there is no possibility of false negatives (but some possibility of false positives).

Thus, when a possible WAR hazard is identified between two rendering jobs, an approximate set membership query filter is in an embodiment maintained for the transition between those rendering jobs. Once the possible WAR hazard has cleared, the approximate set membership query filter for that transition can then be discarded.

Whilst various embodiments have been described above in relation to detecting possible dependencies between two different rendering jobs, it will be appreciated that in general there may be a larger number of rendering jobs being performed and for which at least some processing may desirably overlap within the processing (shader) cores of the graphics processor. In that case, a suitable approximate set membership query filter may then be maintained for each transition.

Subject to the requirements of the technology described herein the graphics processor may otherwise be operated in any suitable and desired manner.

For example, and as alluded to above, the graphics processor is operable and configured to permit separate rendering jobs to be run concurrently and a novel mechanism is therefore in an embodiment provided for allowing the graphics processor to enforce data (processing) dependencies between rendering jobs in that case (e.g. without necessarily having to enforce a stricter (harder) processing barrier between rendering jobs). This will be described further below.

The technology described herein may generally find application in any suitable graphics processing system.

The technology described herein relates particularly to tile-based rendering systems in which a render output (e.g. a frame) is subdivided into plural rendering tiles for the purposes of rendering. In that case each rendering tile may and in an embodiment does correspond to a respective sub-region of the overall render output (e.g. frame) that is being generated. For example, a rendering tile may correspond to a rectangular (e.g. square) sub-region of the overall render output.

In embodiments the rendering is performed using rasterisation. However, it will be appreciated that the technology described herein is not necessarily limited to rasterisation-based rendering and may generally be used for other types of rendering, including ray tracing or hybrid ray tracing arrangements.

The technology described herein can be used for all forms of output that a graphics processing pipeline may be used to generate, such as frames for display, render-to-texture outputs, etc., The technology described herein can generally be used for both graphics and non-graphics (e.g. compute) workloads as well as mixed workloads.

In some embodiments, the graphics processing system comprises, and/or is in communication with, one or more memories and/or memory devices that store the data described herein, and/or store software for performing the processes described herein. The graphics processing system may also be in communication with a host microprocessor, and/or with a display for displaying images based on the data generated by the graphics processing system.

In an embodiment, the various functions of the technology described herein are carried out on a single graphics processing platform that generates and outputs the rendered data that is, e.g., written to a frame buffer for a display device.

The technology described herein can be implemented in any suitable system, such as a suitably configured micro-processor based system. In an embodiment, the technology described herein is implemented in a computer and/or micro-processor based system.

The various functions of the technology described herein can be carried out in any desired and suitable manner. For example, the functions of the technology described herein can be implemented in hardware or software, as desired. Thus, for example, the various functional elements, stages, and pipelines of the technology described herein may comprise a suitable processor or processors, controller or controllers, functional units, circuits/circuitry, processing logic, microprocessor arrangements, etc., that are operable to perform the various functions, etc., such as appropriately configured dedicated hardware elements or processing circuits/circuitry, and/or programmable hardware elements or processing circuits/circuitry that can be programmed to operate in the desired manner.

It should also be noted here that, as will be appreciated by those skilled in the art, the various functions, etc., of the technology described herein may be duplicated and/or carried out in parallel on a given processor. Equally, the various processing stages may share processing circuits/circuitry, if desired.

Thus the technology described herein extends to a graphics processor and to a graphics processing platform including the apparatus of or operated in accordance with any one or more of the embodiments of the technology described herein described herein. Subject to any hardware necessary to carry out the specific functions discussed above, such a graphics processor can otherwise include any one or more or all of the usual functional units, etc., that graphics processors include.

It will also be appreciated by those skilled in the art that all of the described embodiments of the technology described herein can, and in an embodiment do, include, as appropriate, any one or more or all of the optional features described herein.

The methods in accordance with the technology described herein may be implemented at least partially using software e.g. computer programs. It will thus be seen that when viewed from further embodiments the technology described herein provides computer software specifically adapted to carry out the methods herein described when installed on a data processor, a computer program element comprising computer software code portions for performing the methods herein described when the program element is run on a data processor, and a computer program comprising code adapted to perform all the steps of a method or of the methods herein described when the program is run on a data processing system. The data processor may be a microprocessor system, a programmable FPGA (field programmable gate array), etc.

The technology described herein also extends to a computer software carrier comprising such software which when used to operate a graphics processor, renderer or microprocessor system comprising a data processor causes in conjunction with said data processor said processor, renderer or system to carry out the steps of the methods of the technology described herein. Such a computer software carrier could be a physical storage medium such as a ROM chip, RAM, flash memory, CD ROM or disk, or could be a signal such as an electronic signal over wires, an optical signal or a radio signal such as to a satellite or the like.

It will further be appreciated that not all steps of the methods of the technology described herein need be carried out by computer software and thus from a further broad embodiment the technology described herein provides computer software and such software installed on a computer software carrier for carrying out at least one of the steps of the methods set out herein.

The technology described herein may accordingly suitably be embodied as a computer program product for use with a computer system. Such an implementation may comprise a series of computer readable instructions fixed on a tangible medium, such as a non-transitory computer readable medium, for example, diskette, CD-ROM, ROM, RAM, flash memory or hard disk. It could also comprise a series of computer readable instructions transmittable to a computer system, via a modem or other interface device, over either a tangible medium, including but not limited to optical or analogue communications lines, or intangibly using wireless techniques, including but not limited to microwave, infrared or other transmission techniques. The series of computer readable instructions embodies all or part of the functionality previously described herein.

Those skilled in the art will appreciate that such computer readable instructions can be written in a number of programming languages for use with many computer architectures or operating systems. Further, such instructions may be stored using any memory technology, present or future, including but not limited to, semiconductor, magnetic, or optical, or transmitted using any communications technology, present or future, including but not limited to optical, infrared, or microwave. It is contemplated that such a computer program product may be distributed as a removable medium with accompanying printed or electronic documentation, for example, shrink-wrapped software, pre-loaded with a computer system, for example, on a system ROM or fixed disk, or distributed from a server or electronic bulletin board over a network, for example, the Internet or World Wide Web.

FIG. 1 shows a typical computer graphics processing system. An application 2, such as a game, executing on a host processor (CPU) 1 will require graphics processing operations to be performed by an associated graphics processing unit (GPU) (graphics processor) 3 that executes a graphics processing pipeline. To do this, the application will generate API (Application Programming Interface) calls that are interpreted by a driver 4 for the graphics processor 3 that is running on the host processor 1 to generate appropriate commands to the graphics processor 3 to generate graphics output required by the application 2. To facilitate this, a set of "commands" will be provided to the graphics processor 3 in response to commands from the application 2 running on the host system 1 for graphics output (e.g. to generate a frame to be displayed).

As shown in FIG. 1, the graphics processing system will also include an appropriate memory system 5 for use by the host CPU 1 and graphics processor 3.

When a computer graphics image is to be displayed, it is usually first defined as a series of primitives (polygons), which primitives are then divided (rasterised) into graphics fragments for graphics rendering in turn. During a normal graphics rendering operation, the renderer will modify the (e.g.) colour (red, green and blue, RGB) and transparency (alpha, a) data associated with each fragment so that the fragments can be displayed correctly. Once the fragments have fully traversed the renderer, their associated data values are then stored in memory, ready for output, e.g. for display.

In the present embodiments, graphics processing is carried out in a pipelined fashion, with one or more pipeline stages operating on the data to generate the final output, e.g. frame that is displayed.

Figure 2:
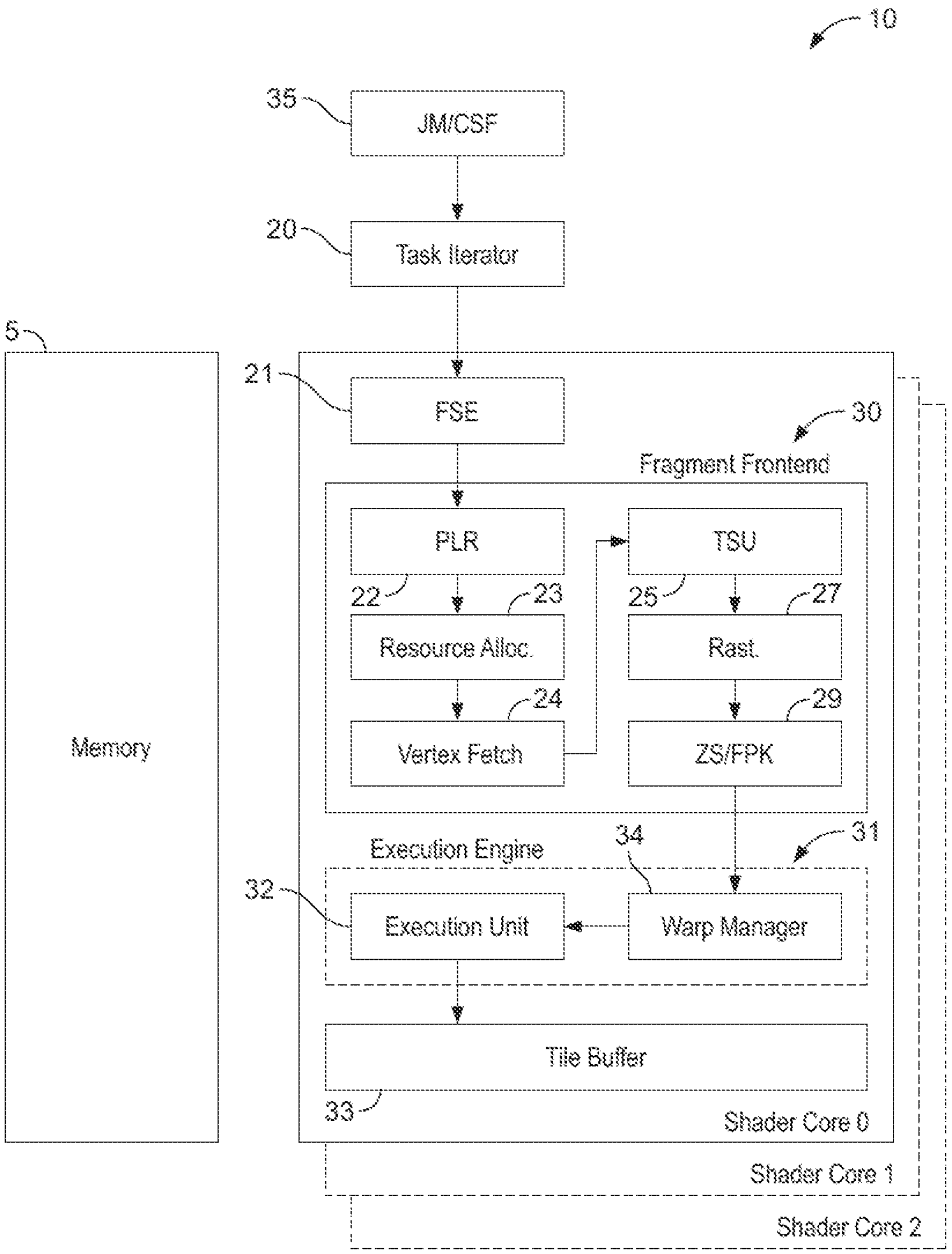
FIG. 2 shows schematically a graphics processing pipeline that can be operated in the manner of the technology described herein.

FIG. 2 shows an exemplary graphics processing pipeline 10 that may be executed by the graphics processor 3 according to an embodiment. The graphics processing pipeline 10 shown in FIG. 2 is a "tile-based" rendering system, and will thus produce tiles of an output data array, such as an output frame to be generated. Thus, an example will now be described in the context of "tile-based" rendering. In FIG. 2, the rendering is performed using rasterisation, as will be explained further below. However, it will be appreciated that the technology described herein is not necessarily limited to rasterisation-based rendering and may generally be used for other types of rendering, including ray tracing or hybrid ray tracing arrangements. Likewise, the technology described herein is not necessarily limited to tile-based rendering and may also be used for other types of rendering including immediate-mode rendering arrangements.

The output data array may typically be an output frame intended for display on a display device, such as a screen or printer, but may also, for example, comprise a "render to texture" output of the graphics processor, or other suitable arrangement.

FIG. 2 shows the main elements and pipeline stages of the graphics processing pipeline 10 according to the present embodiments. As will be appreciated by those skilled in the art, there may be other elements of the graphics processing pipeline that are not illustrated in FIG. 2.

It should also be noted here that FIG. 2 is only schematic, and that, for example, in practice the shown functional units and pipeline stages may share significant hardware circuits, even though they are shown schematically as separate stages in FIG. 2. Equally, some of the elements depicted in FIG. 2 need not be provided, and FIG. 2 merely shows one example of a graphics processing pipeline 10. It will also be appreciated that each of the stages, elements and units, etc., of the graphics processing pipeline as shown in FIG. 2 may be implemented as desired and will accordingly comprise, e.g., appropriate circuits and/or processing logic, etc., for performing the necessary operation and functions.

The graphics processing pipeline as illustrated in FIG. 2 will be executed on and implemented by the graphics processing unit (GPU) (graphics processor) 3, which will accordingly include the necessary functional units, processing circuits, etc., operable to execute the graphics processing pipeline stages.

(It will be appreciated that the graphics processing unit (GPU) (graphics processor) 3 may, and generally will, include various other functional units, processing circuits, etc., not shown in FIG. 2. This may include various functional units, processing circuits, etc., that are operable to execute non-graphics processing work. For example, in addition to graphics processing work, the graphics processing unit (GPU) (graphics processor) 3 may also be operable to perform general-purpose "compute" operations, and may therefore also include various functional units, processing circuits, etc., operable to execute such non-graphics processing work. Thus, although not shown in FIG. 2, the shader cores may for example, in addition to the fragment shader endpoint 21 that will be described below, also comprise a suitable "compute" shader endpoint that is operable and configured to issue compute tasks to the execution engine 31 for processing. The shader cores may, for example, also contain other suitable endpoints, as desired, that are operable and configured to issue other types of tasks to the execution engine 31 for processing. Various arrangements would be possible in this regard.)

FIG. 2 shows the stages of the graphics processing pipeline after a tiler (not shown) of the graphics processor has prepared the primitive lists (as the graphics processing pipeline 10 is a tile-based graphics processing pipeline).

(The tiler in effect determines which primitives need to be processed for different regions of the output. In the present embodiments, these regions may, e.g., represent a tile into which the overall output has been divided into for processing purposes, or a set of multiple such tiles. To do this, the tiler compares the location of each primitive to be processed with the positions of the regions, and adds the primitive to a respective primitive list for each region that it determines the primitive could (potentially) fall within. Any suitable and desired technique for sorting and binning primitives into tile lists, such as exact binning, or bounding box binning or anything in between, can be used for the tiling process.)

Once the tiler has completed the preparation of the primitive lists (lists of primitives to be processed for each region), then each tile can be rendered with reference to its associated primitive list(s).

To do this, each tile is processed by the graphics processing pipeline stages shown in FIG. 2.

A fragment task iterator 20 is thus provided that schedules processing work to the graphics processing pipeline 10.

The fragment task iterator 20 may thus schedule the graphics processing pipeline to generate a first output, which may, e.g. be a frame to display. In the present embodiments, wherein the graphics processing pipeline 10 is a tile-based system, in which the output has been divided into a plurality of rendering tiles, the graphics processing pipeline 10 iterates over the set of tiles for the first output, rendering each tile in turn.

As shown in FIG. 2, the graphics processor 3 includes an overall controller in the form of a job manager circuit (a command stream frontend circuit) 35, that is operable to receive tasks for the graphic processor 3 for processing from the host processor 1, which job manager 35 can then communicate the relevant jobs to respective elements of the graphics processor and graphics processing pipeline 10, via an appropriate bus/interconnect.

Thus, as shown in FIG. 2, the job manager 35 will, inter alia, issue fragment processing tasks to the fragment task iterator 20 for the fragment task iterator 20 to then schedule the appropriate fragment shading tasks to and onto the graphics processing pipeline 10.

In the present embodiments, the graphics processing pipeline 10 is implemented by means of an appropriate processing ("shader") core. In particular, as shown in FIG. 2, the graphics processor 3 includes a plurality of "shader" cores that are each configured to implement a respective parallel instance of the graphics processing pipeline 10. Thus, the fragment task iterator 20 is operable to and configured to issue tasks to different ones of the of shader cores, e.g. to try to balance processing work between the different shader cores.

(Although not shown in FIG. 2, there may be various other task iterators that control the issuing of "compute" or other tasks, etc.)

As will be explained further below, each "shader" core includes a fragment "frontend" 30 that may be, and typically is, implemented in essentially fixed-function hardware, and that performs set up for the fragment shader programs, as well as a programmable stage (execution engine 31) that executes the fragment shader programs to perform the actual rendering.

When a rendering task (i.e. tile) is allocated to a given shader core for processing, the tile is then processed (rendered) accordingly, i.e. by the graphics processing pipeline 10.

For a given tile that is being processed, a primitive list reader (or 'polygon list reader') 22 thus identifies a sequence of primitives to be processed for that tile (the primitives that are listed in the primitive list(s) for that tile), and an ordered sequence of primitives for the tile is then issued into the graphics processing pipeline 10 for processing.

A resource allocator 23 then configures and manages the allocation of memory space for the depth (Z), colour, etc., buffers 33 for the tile of the output that is being generated. These buffers may, e.g., be provided as part of RAM that is located on (local to) the graphics processing pipeline (chip).

A vertex loader 24 then loads in the vertices for the primitives, which are then passed into a primitive set-up unit (or 'triangle set-up unit') 25 that operates to determine, from the vertices for the primitives, edge information representing the primitive edges.

The edge information for the re-ordered primitives is then passed to the rasteriser 27, which rasterises the primitives into a set of one or more sampling positions and generates from the primitives individual graphics fragments having appropriate positions (representing appropriate sampling positions) for rendering the primitive.

The fragments generated by the rasteriser 27 are then sent onwards to the rest of the pipeline for processing.

For instance, in the present embodiments, the fragments generated by the rasteriser 27 are subject to (early) depth (Z)/stencil testing 29, to see if any fragments can be discarded (culled) at this stage. To do this, the Z/stencil testing stage 29 compares the depth values of (associated with) fragments issuing from the rasteriser 27 with the depth values of fragments that have already been rendered (these depth values are stored in a depth (Z) buffer that is part of the tile buffer 33) to determine whether the new fragments will be occluded by fragments that have already been rendered (or not). At the same time, an early stencil test is carried out.

Fragments that pass the fragment early Z and stencil test stage 29 may then be subject to further culling operations, such as a 'forward pixel kill' test, e.g. as described in United States Patent Application Publication No. 2019/0088009 (Arm Limited), before the remaining fragments are then passed to a fragment shading stage, in the form of an execution engine 31, for rendering.

The processing stages including the primitive list reader (or 'polygon list reader') 22 up to the (early) depth (Z)/stencil testing 29 thus together constitute a fragment "frontend" 30 that serves to set up the required data for the fragment processing operations to be performed by the execution engine 31.

The execution engine 31 then performs the appropriate fragment processing operations on the fragments that pass the early Z and stencil tests, so as to process the fragments to generate the appropriate rendered fragment data.

This fragment processing may include any suitable and desired fragment shading processes, such as executing fragment shader programs for the fragments, applying textures to the fragments, applying fogging or other operations to the fragments, etc., to generate the appropriate rendered fragment data.

Thus, as shown in FIG. 2, in the present embodiment, the execution engine 31 includes a programmable execution unit (engine) 32 operable to execute fragment shader programs for respective execution threads (where each thread corresponds to one work item, e.g. an individual fragment, for the output being generated) to perform the required fragment shading operations to thereby generate rendered fragment data. The execution unit 32 can operate in any suitable and desired manner in this regard and comprise any suitable and desired processing circuits, etc.

In the present embodiments, the execution threads may be arranged into "groups" or "bundles" of threads, where the threads of one group are run in lockstep, one instruction at a time, i.e. each thread in the group executes the same single instruction before moving onto the next instruction. In this way, it is possible to share instruction fetch and scheduling resources between all the threads in a group. Such thread groups may also be referred to as "sub-groups", "warps" and "wavefronts". For convenience the term thread group will be used herein, but this is intended to encompass all equivalent terms and arrangements, unless otherwise indicated.

FIG. 2 accordingly also shows a thread group controller, in the form of a warp manager 34, that is configured to control the allocation of work items (e.g. fragments) to respective thread groups for the fragment shading operations to be performed by the programmable execution unit 32, and the issuing of thread groups to the programmable execution unit 32 for the execution of the fragment shading programs by respective thread groups.

As shown in FIG. 2, the programmable execution unit 32 is also in communication with the memory 5.

Once the fragment shading is complete, the output rendered (shaded) fragment data is written to the tile buffer 33 from where it can, for example, be output to a frame buffer (e.g. in the memory 5) for display. The depth value for an output fragment is also written appropriately to a Z-buffer within the tile buffer 33. (The tile buffer stores colour and depth buffers that store an appropriate colour, etc., or Z-value, respectively, for each sampling position that the buffers represent (in essence for each sampling position of a rendering tile that is being processed).) These buffers store an array of fragment data that represents part (a tile) of the overall output (e.g. image to be displayed), with respective sets of sample values in the buffers corresponding to respective pixels of the overall output (e.g. each 2×2 set of sample values may correspond to an output pixel, where 4× multisampling is being used).

As mentioned above, the tile buffer 33 is normally provided as part of RAM that is located on (local to) the graphics processor.

Once a tile for the output has been processed, the data from the tile buffer(s) may thus be written back to an external memory output buffer, such as a frame buffer of a display device (not shown), e.g. in the memory 5. (The display device could comprise, e.g., a display comprising an array of pixels, such as a computer monitor or a printer.)

The next tile is then processed, and so on, until sufficient tiles have been processed to generate the entire output (e.g. frame (image) to be displayed). The process is then repeated for the next output (e.g. frame) and so on.

For a given output (e.g. frame (image) to be displayed) the graphics processor will perform at least one render pass to generate the output. In general, the generation of a given output (e.g. frame (image) to be displayed) may however involve a sequence of plural render passes (with each render pass comprising potentially plural rendering jobs to be performed). This may for example include a first render pass that generates an "intermediate" output (e.g. such as a "render to texture" output) which is then followed by a second render pass that consumes the output from the first render pass when generating its own output (which may be the "final" output (e.g. frame (image) to be displayed)).

Thus, a typical command stream for the tile-based graphics processor may include commands to perform a sequence of render passes, e.g. as follows:

RUN_FRAG_0
RUN_FRAG_1
. . .

with each RUN_FRAG command corresponding to a respective fragment processing (rendering) job that is to be performed using the graphics processing pipeline.

(Note that although not shown in this example a render pass for producing a particular render output (e.g. frame) may generally comprise various different types of rendering jobs, such that a fragment processing (rendering) job within a render pass may also be followed by other types of rendering jobs that relate to the same render output. An example of this might be when a "compute" job is used to calculate 'mist' effects for a respective render output produced by a fragment processing (rendering) job. Thus, a command stream may generally also contain various other types of commands for performing other types of rendering jobs, as desired.)

Although each fragment processing (rendering) job represents a separate instance of implementing the graphics processing pipeline, there may be various data (processing) dependencies between different rendering jobs being performed. For example, in the case that one rendering job generates an "intermediate" output that is to be consumed by the next rendering job, the later rendering job should generally not be performed until the earlier rendering job has been performed. More precisely, in the case of a tile-based rendering system, where a later rendering job has a data (processing) dependency on an earlier rendering job, a particular rendering task for rendering a given tile for the later rendering job should not be performed until the equivalent tile for the earlier rendering job has been processed, so that the required portion of the render output associated with that rendering tile is available.

Thus, as mentioned above, each rendering job generally comprises a plurality of rendering tasks which may, e.g., and in the present embodiments do, correspond to respective rendering tiles into which the output (render target) for the render pass is subdivided for rendering purposes. The command stream including the RUN_FRAG commands may thus be received by the job manager circuit (a command stream frontend circuit) 35, which identifies the rendering jobs to be performed, which rendering jobs are then broken down into respective smaller rendering tasks (e.g. tiles) that are provided to the fragment task iterator 20 for the fragment task iterator 20 to then schedule the appropriate fragment shading tasks to and onto the graphics processing pipeline 10. (The rendering tasks may then be further broken down into smaller work items within the shader core.)

In order to ensure that any data (processing) dependencies between rendering jobs are enforced, the job manager circuit (a command stream frontend circuit) 35 may in some more traditional graphics processing arrangements enforce a strict (hard) processing barrier between rendering jobs (which barrier may be, and traditionally is, enforced between fragment processing (rendering) jobs for different render passes, but also between different types of rendering jobs within the same render pass), e.g. such that in the example given above all of the rendering tasks associated with the RUN_FRAG_0 command would be issued and processed to completion before the job manager circuit (a command stream frontend circuit) 35 permitted any rendering tasks associated with the RUN_FRAG_1 command to be issued for processing.

Figure 3:
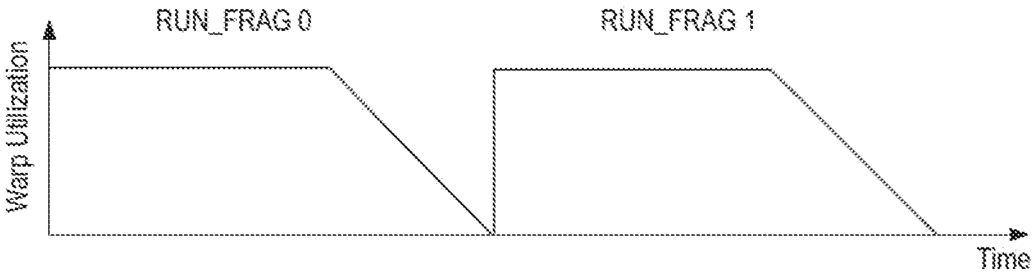
FIG. 3 illustrates a more traditional graphics processor operation in which strict processing barriers are enforced between separate rendering jobs.

This more traditional graphics processor operation is illustrated in FIG. 3. This approach works well to ensure safe graphics processing operation. However, as depicted in FIG. 3, especially towards the end of the rendering jobs, there is relatively lower warp utilisation. This is because towards the end of the rendering job, there may be fewer rendering tasks to be performed compared to the number of available shader cores. (Although not shown in FIG. 3, note that there may typically also be relatively lower warp utilisation during an initial ramp-up period). However, because of the hard (strict) processing barrier between rendering jobs, the job manager circuit (a command stream frontend circuit) 35 cannot start to issue rendering tasks for the next rendering job for processing, and so any shader cores that have completed their processing may sit idle for a number of cycles waiting for the other shader cores to finish processing their respective rendering tasks.

Figure 4:
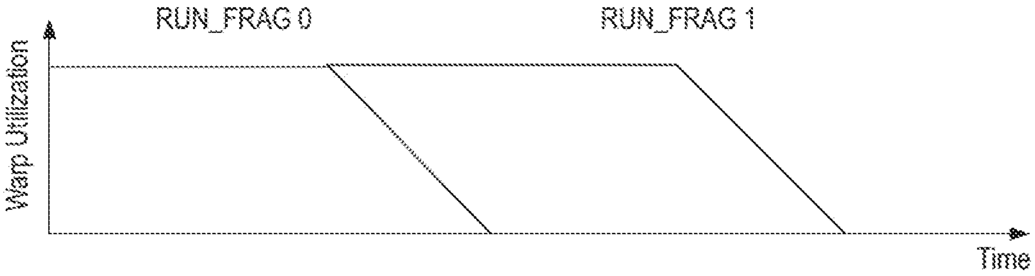
FIG. 4 illustrates an improved graphics processor operation according to embodiments of the technology described herein in which separate rendering jobs can overlap.

The present embodiments thus provide a mechanism for safely allowing separate rendering jobs to be issued for processing, and processed, concurrently, e.g. using different shader cores (although the processing could also be performed concurrently on the same shader core, e.g. so long as forward progress of the earlier rendering job can be guaranteed). This improvement is illustrated in FIG. 4, which shows that towards the end of the first rendering job (RUN_FRAG_0), the shader cores are permitted to start processing rendering tasks for the next rendering job (RUN_FRAG_1), such that the processing of rendering tasks for different rendering jobs is allowed to overlap across different shader cores, hence increasing the overall shader core utilisation.

In particular, to do this, and ensure that any data dependencies between rendering jobs can still be enforced as needed, the present embodiments track, for each rendering job that is currently in flight, the completion status of the respective rendering tasks to be performed for the rendering job in question. Based on this tracking, it is then possible to control the processing of rendering tasks for a later (e.g. the next) rendering job in a sequence of rendering jobs being performed.

Figure 5A:
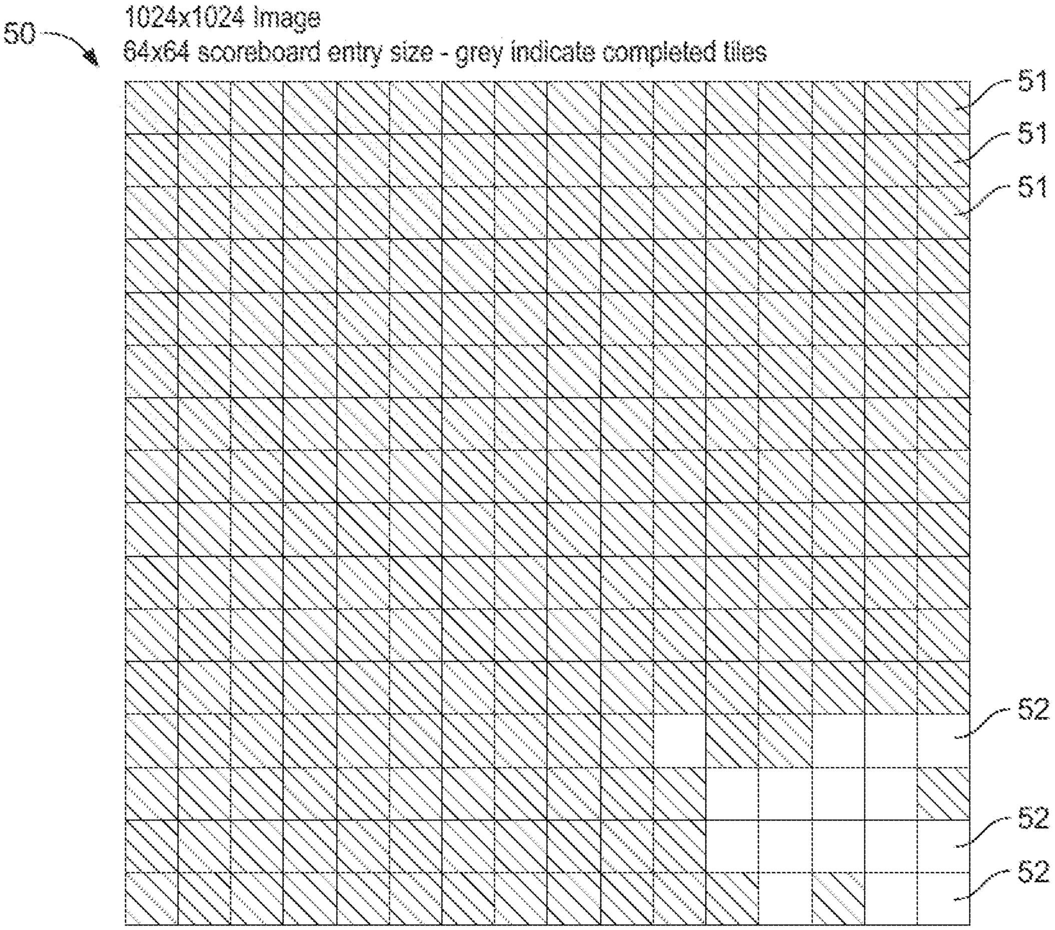
FIG. 5A shows a 'task completion status' data structure that may be used to track the completion status of rendering tasks for an associated rendering job according to a first example.

FIG. 5A shows an example of a 'task completion status' data structure 50 that may be used to track the completion status of rendering tasks for an associated rendering job. As shown in FIG. 5A, the 'task completion status' data structure 50 in this example is in the form of a tile-based "scoreboard" that is operable to track the completion status for the individual rendering tasks that the output for the rendering job is subdivided into.

For example, in the case where the render output is an 1024×1024 image, which image is subdivided for rendering purposes into a 64×64 array of rendering tiles, the 'task completion status' data structure 50 may then comprise a corresponding 64×64 array of entries, with each entry storing a (binary) indication as to whether or not the respective task (i.e. tile) associated with that entry has completed its processing. Thus, as depicted in FIG. 5A, the grey entries 51 indicate tasks (tiles) that have completed their processing, and for which a respective bit is therefore set (e.g. to '1') to indicate this, whereas the white entries 52 indicate tasks (tiles) that have not yet completed their processing (and for which the respective bit is therefore cleared (e.g. '0')).

Figure 5B:
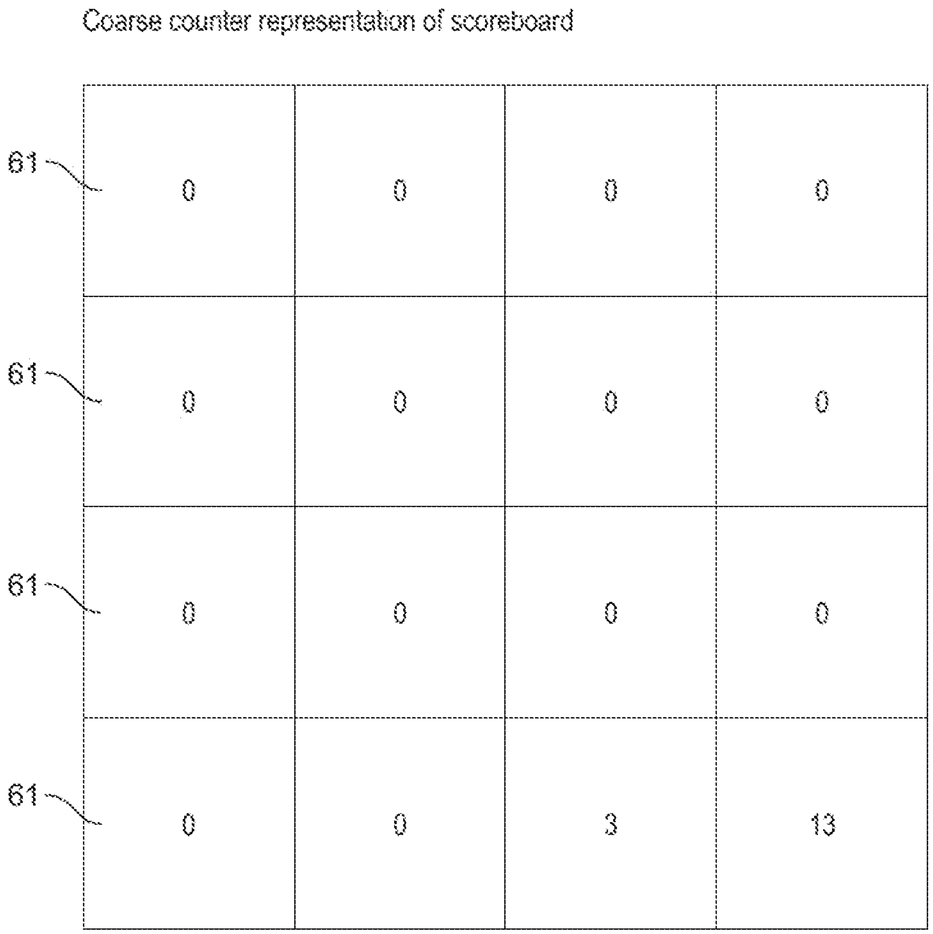
FIG. 5B shows a 'task completion status' data structure that may be used to track the completion status of rendering tasks for an associated rendering job according to a second example.

In FIG. 5A, the 'task completion status' data structure 50 thus comprises a bit array that indicates for each rendering task (tile) to be performed for the rendering job with which the 'task completion status' data structure 50 is associated whether or not the rendering task (tile) has completed its processing. A respective 'task completion status' data structure 50 for a rendering job can thus be allocated within the fragment task iterator 20 at the start of the rendering job, and then suitably initialised. For example, any entries within the 'task completion status' data structure 50 corresponding to tasks (tiles) which reside outside of the region to which the rendering job will write to can be initially set (e.g.) to '1' to effectively indicate that those tasks (tiles) have completed their processing (since there is no processing to be done, and so there can be no data (processing) dependencies on those tasks (tiles)), whereas all other entries are cleared (e.g.) to '0' when the 'task completion status' data structure 50 is allocated, with those entries thus being updated (and set) appropriately as the corresponding rendering tasks complete. FIG. 5B shows an embodiment of a relatively coarser 'task completion status' data structure that may be used to track the completion status of rendering tasks for an associated rendering job, illustrating the same amount of completion in the example shown in FIG. 5A, but wherein rather than storing indicators for individual rendering tasks, the 'task completion status' data structure instead indicates for groups of rendering tasks (tiles) whether or not the group of rendering tasks (tiles) as a whole has completed its processing. Thus, each entry 61 in the 'task completion status' data structure in FIG. 5B represents a corresponding group of rendering tasks (tiles) (in this example 16 but in general the tracking may be performed at any suitable and desired granularity).

In FIG. 5B, rather than storing a (binary) indicator as to whether the group has completed its processing, it is instead tracked for each group of rendering tasks (tiles) how many of the rendering tasks (tiles) within the group of rendering tasks (tiles) are still being processed. In this case, the reference counts that are stored within the 'task completion status' data structure may be initialised, on allocation of the data structure, to zero. Then, as rendering tasks are issued, the respective entries will have their reference count incremented. As the rendering tasks complete their processing, the respective reference counters are accordingly decremented and once the counter for a respective group of rendering tasks (tiles) returns to zero, this indicates that the group of rendering tasks (tiles) has completed its processing. Thus, in the present example, as depicted in FIG. 5B, most of the group of rendering tasks (tiles) have completed their processing, as the respective counters have been decremented to zero. However, (and as shown in FIG. 5A which shows the tracking of the individual rendering tasks) there are still rendering tasks within the final two groups of rendering tasks that have not completed their processing and so the counters for those groups are non-zero.

Various other arrangements would of course be possible for tracking the completion status of rendering tasks, or groups thereof.

The 'task completion status' data structure, in whatever form it takes, can then be used accordingly to control the processing of rendering tasks (tiles) for the next frame to enforce any required data (processing) dependencies between rendering tasks. For instance, FIG. 6 shows an example of a so-called 'read-after-write' dependency between two render passes, where the later render pass (RenderPass2) needs to read data from render targets (ImageA and ImageB) that are written to be the earlier render pass (RenderPass1).

In this situation, the rendering tasks for any rendering jobs for the later render pass (RenderPass2) that read from these render targets (images) should therefore not be processed until the processing of the corresponding rendering tasks for the earlier render pass (RenderPass1) is complete, i.e. so that the relevant portions of the render targets (images) have been written accordingly by the rendering jobs for earlier render pass prior to any rendering jobs for the later render pass reading those portions.

Figure 6:
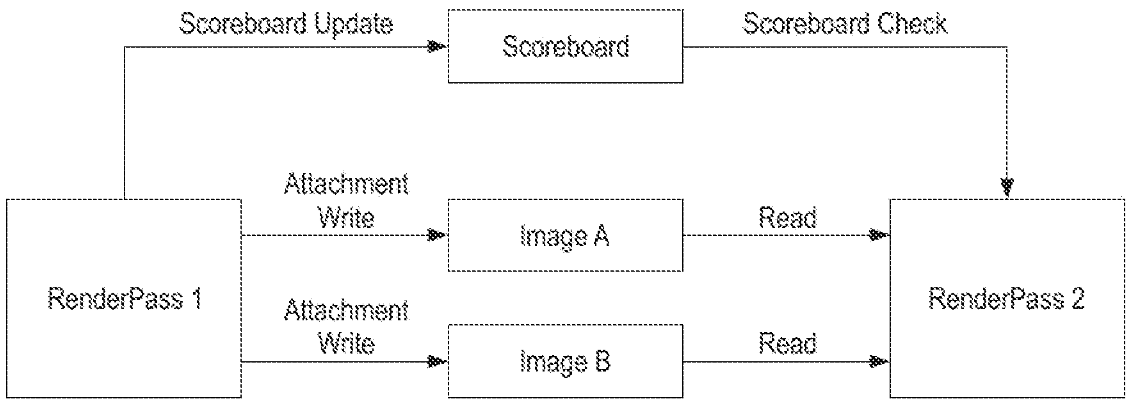
FIG. 6 shows an example of a so-called 'read-after-write' dependency between two render passes.

As shown in FIG. 6, the 'task completion status' data structure ("scoreboard") is thus updated as and when the rendering tasks for the rendering job for the earlier render pass complete. The rendering job for the later render pass is thus operable and configured to check the scoreboard appropriately prior to performing the required read operations to check whether or not the relevant rendering tasks have completed their processing. If not, the rendering tasks for the rendering job for the later render pass may be stalled until the required data is available (i.e. until the corresponding rendering task for the rendering job for the first render pass has completed its processing and the scoreboard updated accordingly to reflect this).

Figure 7:
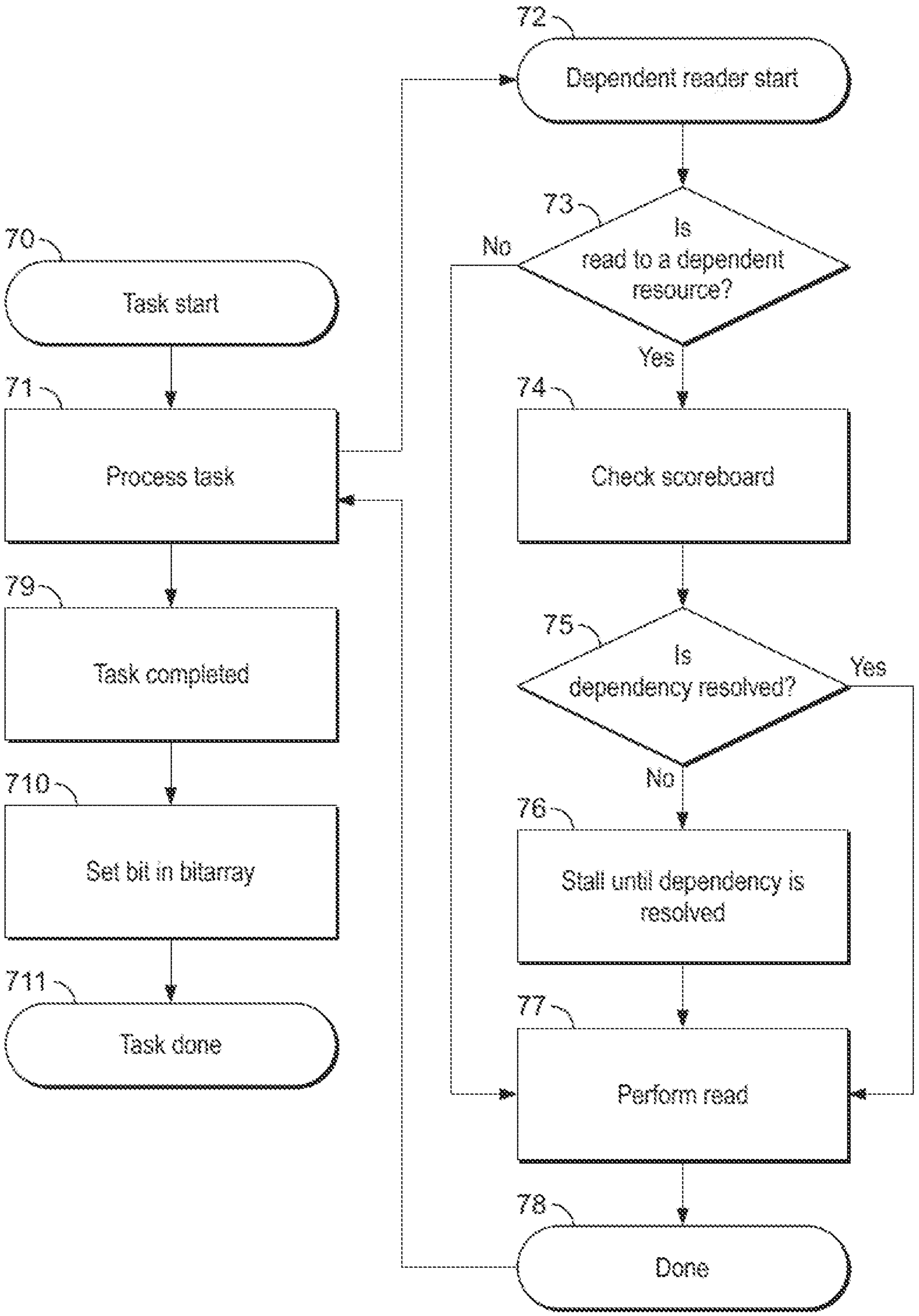
FIG. 7 is a flow chart illustrating how such data dependencies can be controlled according to embodiments.

FIG. 7 is a flow chart illustrating how such data dependencies can be controlled using the scoreboard according to the present embodiments. In particular, FIG. 7 shows the processing of a particular rendering task within a given rendering job for a particular render pass. Thus, the rendering task may be scheduled for processing by the task iterator 20 (at step 70), and the processing of the rendering task begun (step 71). At some point during the processing of the rendering task, it may be identified that there is a potential data dependency that needs to be checked before performing a read operation, and so a dependent reader routine is started (step 72), as follows.

Firstly, it is checked whether the read is to a dependent resource (step 73). If not (step 73—no), i.e. there is no data dependency, the read can then be performed immediately (step 77), and this is done, thus allowing the task to progress further.

On the other hand, if it is identified that is a potential data dependency, i.e. the read is to a dependent resource (step 73—yes), the scoreboard for the earlier rendering job on which the processing potentially depends is then checked (step 74) to see whether the dependency is released. If it can be determined that the dependency is resolved (step 75—yes), i.e. because the scoreboard check (at step 74) indicates that the corresponding rendering task for the earlier rendering job has already completed, the read can then be performed (step 77), and this is done, as described above.

However, if it cannot be determined that the dependency is resolved (step 75—no), i.e. because the scoreboard check (at step 74) indicates that the corresponding rendering task for the earlier rendering job has not completed its processing, the read cannot be performed, and so the read is stalled until it can be determined that the dependency is resolved (step 76). In this case, when the corresponding rendering task for the earlier rendering job complete, the associated scoreboard for the earlier render pass will be updated, such that the dependency is resolved, and at some point the stall will be released, so that the read can be performed (step 77), and so the task can progress further.

It will be appreciated that a single rendering task may spawn many execution threads which execute a multitude of shader programs and each thread may perform multiple reads. Each of these memory accesses may need to perform a dependency check as described above (i.e. in steps 73 to 77). Once all of the threads for the rendering task have completed their processing (step 78), the processing of the rendering task can be completed (step 79), with the tile outputs being written to memory, and an appropriate update being performed to the respective scoreboard for the rendering job to indicate that the task has completed its processing (step 710). The rendering task is then done (step 711).

Figure 8A:
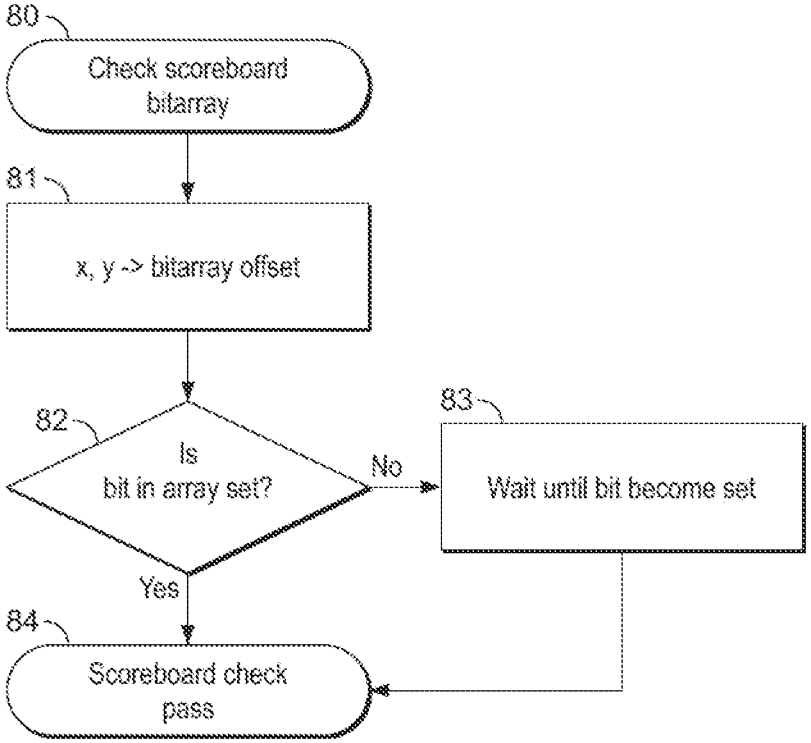
FIG. 8A illustrates the use of the 'task completion status' data structure according to FIG. 5A.

FIG. 8A illustrates the checking of the scoreboard (i.e. at step 74) according to FIG. 5A. In this example, when it is needed to check the scoreboard bit array in respect of a rendering task (step 80, corresponding to step 74 in FIG. 7), it is then identified which position in the scoreboard for the earlier rendering job corresponds to the rendering task on which the current rendering task potentially depends (step 81) (e.g. by working out which bit in the bit array corresponds to the position of the rendering tile to which the rendering task relates).

If the bit is not set, indicating that the corresponding rendering task for the earlier render pass has not yet completed its processing (step 82—no), this means that it cannot be determined that the dependency has resolved, and so the read should stall. Thus, the processing waits until the scoreboard is updated (step 83) and the scoreboard check can be passed (step 84). Whereas, if the bit is set, indicating that the corresponding rendering task for the earlier render pass has completed its processing, it is determined on this basis that the dependency has resolved, and the scoreboard check can be passed (step 84).

Figure 8B:
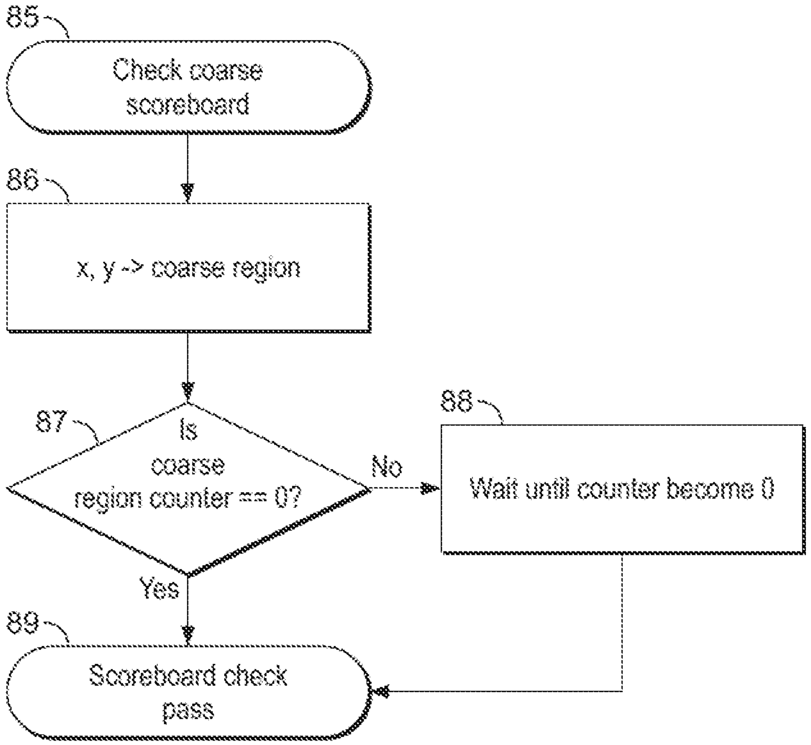
FIG. 8B illustrates the use of the 'task completion status' data structure according to FIG. 5B.

FIG. 8B shows a corresponding checking of the scoreboard according to FIG. 5B. In this case, when it is needed to check the scoreboard (step 85), it is identified which region in the scoreboard for the earlier pass includes the rendering task on which the current rendering task potentially depends (step 86). If the counter for that region has decremented to zero (step 87—yes), indicating that the corresponding rendering task for the earlier render pass has completed its processing, it is determined on this basis that the dependency has resolved, and the scoreboard check can be passed (step 89). On the other hand, if the counter for that region is not equal to zero (step 87—no), indicating that there are at least some rendering tasks in that region that have not completed, a wait is implemented (step 88) until the scoreboard is updated.

Various other arrangements would be possible, e.g. depending on the configuration of the scoreboard.

Figure 9:
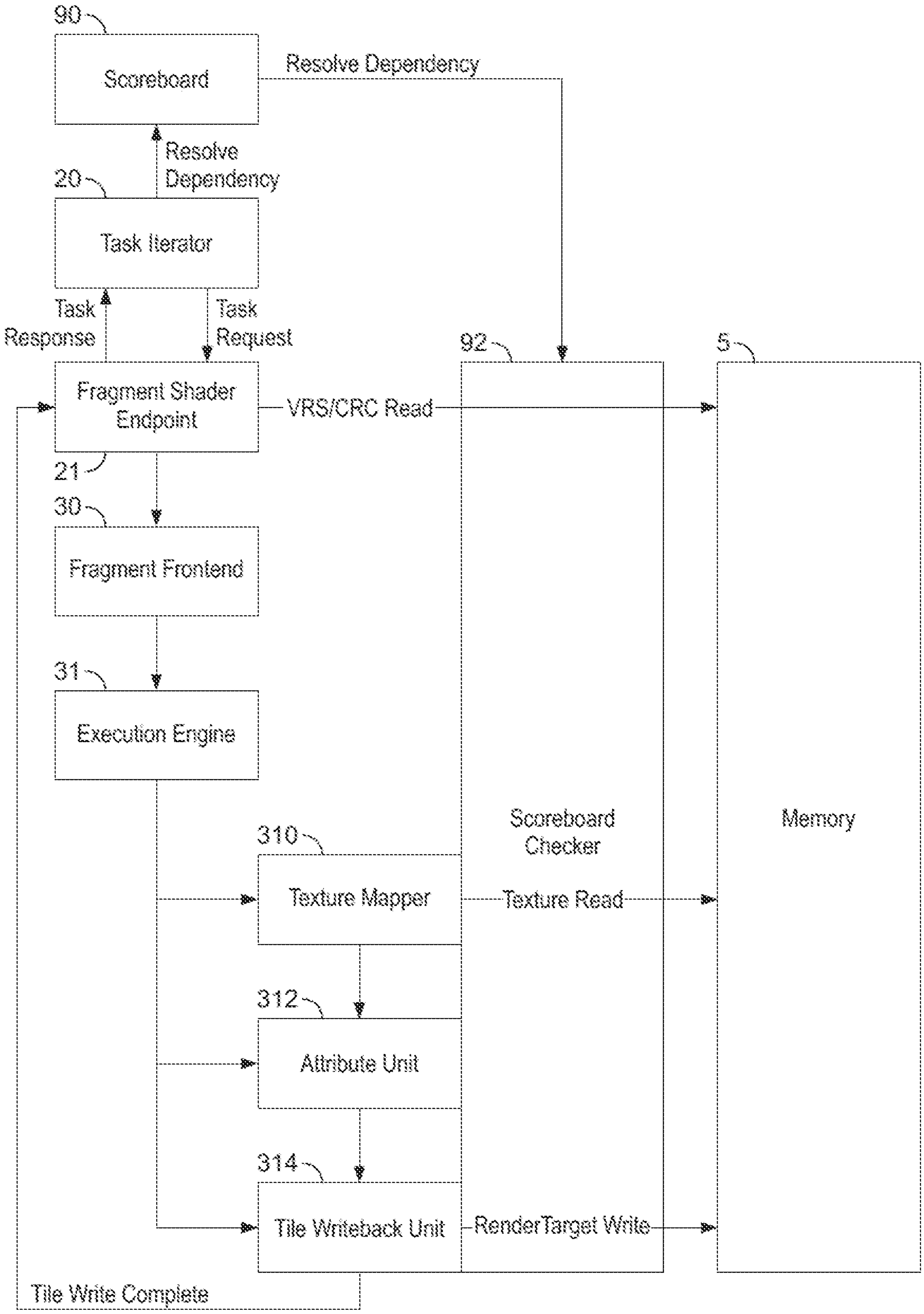
FIG. 9 illustrates the operation of a graphics processor according to an embodiment.

In this way, it is possible to control the processing of rendering task within the shader cores in order to enforce data dependencies. That is, rather than strictly enforcing processing barriers between rendering jobs within the job manager circuit (a command stream frontend circuit) 35, it is possible to move the dependency management between rendering jobs into the graphics processor hardware, with the dependencies being checked at the point at which a memory access is required. This is illustrated in FIG. 9. FIG. 9 thus illustrates the operation of a graphics processor according to an embodiment.

As shown in FIG. 9, and as described above, the task iterator 20 controls the scheduling and issuing of tasks to the shader cores for processing, via the fragment shader endpoint 21. The fragment shader endpoint 21 for a shader core then issues rendering tasks for processing by the graphics processing pipeline that is being implemented by the respective shader core, e.g. by first executing the fragment frontend processing 30, and then passing any surviving fragments to the execution engine 31 for execution of the required fragment shader programs. The fragment shader program then performs the desired rendering.

There are various points within the graphics processing pipeline where memory access may be required and where the memory access may potentially require access to a data buffer that is written by an earlier rendering job. According to the present embodiments, as described above, the scoreboard 90 can thus be (and is) used whenever such memory accesses are required in order to enforce any potential data dependencies between rendering jobs.

For example, as shown in FIG. 9, the fragment shader endpoint 21 may need to read in from memory 5 certain state information or parameters such as variable rate shading parameters, or tile signatures for transaction elimination, e.g. in the form of a CRC buffer. However, these parameters may in turn be generated by an earlier rendering job (e.g. within a previous render pass). Thus, the fragment shader endpoint 21, prior to reading in any such parameters, is operable and configured to check the scoreboard 90 to see if any potential data dependencies exist, and if so, check whether they are resolved. (This can then be done as described above using the dependent reader operation shown in FIG. 7.)

Similarly, the execution engine 31 when executing a shader program may at various points during shader program execution require memory access. For instance, an example of this would be when the rendering task requires a texture to be read in via the texture mapper unit 310 of the execution engine 31. However, again, the required texture may have been generated by an earlier rendering job within a previous render pass, e.g. as a "render to texture" output. Accordingly, the texture mapper unit 310 may perform the texture read via a suitable scoreboard checker 92 that is operable to and configured to check whether or not the dependency is resolved.

A similar situation occurs for reads through the attribute unit 312 which can again be performed via the scoreboard checker 92, in the same manner as described above.

When the rendering task is completed, the tile writeback unit 314 can then write the output (render target) accordingly to the memory 5. This is then signalled appropriately to the fragment shader endpoint 21 which in turn can signal this information to the scoreboard 90 to cause an appropriate update of the scoreboard 90 associated with the current rendering job.

Thus, as shown in FIG. 9, the fragment shader endpoint 21 in an embodiment triggers and controls updating of the scoreboard 90 for the current rendering job. Then, during the processing of the current rendering job, the scoreboard checker 92 within the shader core is operable and configured to check, as necessary, the corresponding scoreboard 90 for an earlier rendering job to ensure any data dependencies are resolved prior to performing any memory access to a potentially dependent resource.

FIG. 6 above shows an example of a so-called 'read-after-write' dependency between two render passes, which 'read-after-write' dependency can be handled as described above.

Figure 10:
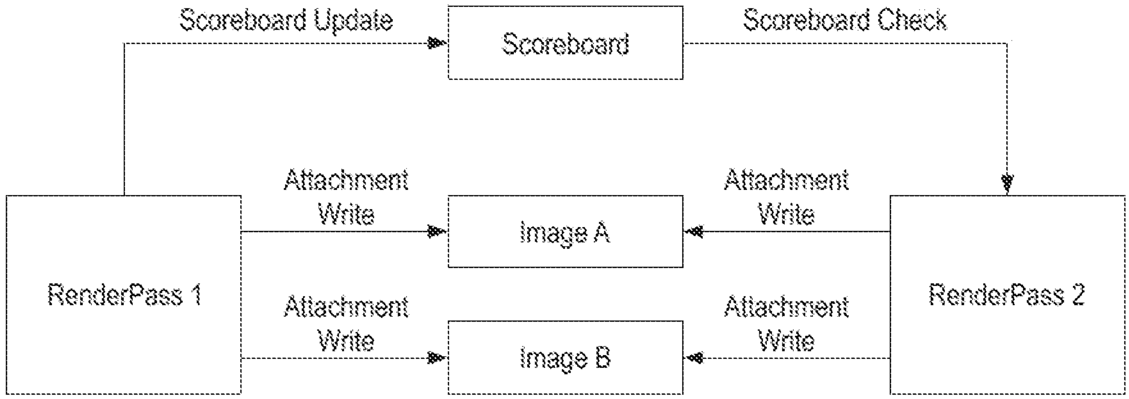
FIG. 10 shows an example of a so-called 'write-after-write' dependency between two render passes.

FIG. 10 shows an example of a so-called 'write-after-write' dependency between two render passes, where the later render pass overwrites a render target (image) that is also written to by the earlier render pass. These dependencies can generally be handled similarly to the 'read-after-write' dependencies illustrated in FIG. 6, using the techniques described above.

However, it will be appreciated that there may be other situations, or types of dependencies, that cannot be handled in this way.

Figure 11:
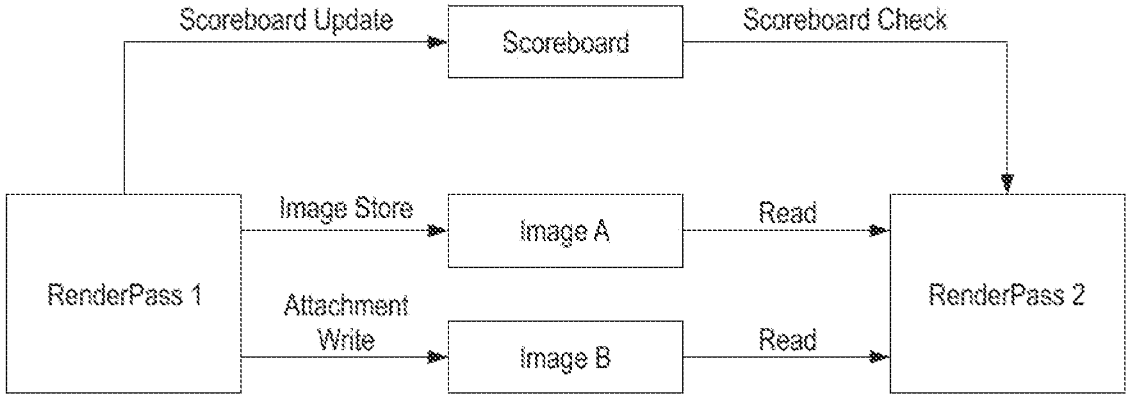
FIG. 11 shows an example of a shader side effect that may be present within a render pass.

An example where the job manager circuit (a command stream frontend circuit) 35 may need to enforce a hard processing barrier may be where a render pass includes 'side effects'. An example of this is shown in FIG. 11 where the earlier render pass performs an 'Image Store' operation for a render target (ImageA) that is to be read by the later render pass. This Image Store operation may be present within any arbitrary one of the rendering tasks for the earlier render pass, and this may not be known in advance, and so it is not generally safe to start processing the later render pass in this situation until all of the rendering tasks for the earlier render pass have completed.

Another example of this might be a 'write-after-read' dependency where a rendering job for a later render pass may write to a render target (image) that a rendering job for an earlier render pass potentially needs to read from. In that case, the read operations may generally be unconstrained such that a read may be performed as part of any one of the rendering tasks for the rendering job for the earlier render pass. In that case, it may be not be safe to start issuing any rendering tasks for the later render pass, and a hard processing barrier may therefore be enforced by the job manager circuit (a command stream frontend circuit) 35.

Figure 12:
FIG. 12 shows an example of a so-called 'write-after-read' dependency between two render passes.

FIG. 12 shows an example where such a 'write-after-read' dependency exists. In particular, in the example shown in FIG. 12, there is a single render target (ImageA), associated with a respective data buffer. In this example, the earlier render pass may need to read the image (ImageA) from that data buffer. However, the later render pass can potentially write to the same render target (data buffer), and so overwrite the image (ImageA). Thus, there is a potential 'write-after-read' ("WAR") dependency associated with the data buffer.

In that case, the read may generally be unconstrained such that a read may be performed as part of any one of the rendering tasks for the earlier render pass. In that case, a stricter (harder) processing barrier may therefore be enforced by the job manager circuit (a command stream frontend circuit) 35 in particular such that processing of rendering tasks for the later render pass is controlled so that any writes to that data buffer (ImageA) are stalled until all of the rendering tasks for the earlier render pass have completed their processing.

The scheme as presented above may therefore not be able to handle such a WAR dependency and the graphics processor may therefore need to fall back to enforcing a stricter (harder) processing barrier between render passes in the case that such a WAR dependency is identified. The present embodiments thus further provide an improved mechanism for handling such WAR dependencies.

In this respect, the present Applicants recognise that it may be possible for the host processor (CPU) 1 (and in particular a driver 4 for the graphics processor 3) when preparing command streams for the graphics processor to detect possible WAR hazards between rendering jobs (or render passes) by identifying changes in memory access permissions. For example, the driver 4 may be able to identify that there a transition from a readable state to a writeable state, indicating a possible WAR hazard. However, it will typically not be known until the next render pass whether the later render pass actually accesses any of the data buffers (render targets) in question. That is, the driver 4 may be able to identify a possibility of a WAR hazard, but typically does not have sufficient information to determine whether there is an actual WAR dependency for any of the data buffers (render targets) that will be accessed by the later rendering job. This is because the different rendering jobs are likely to reside in different command buffers on the host processor (CPU) 1 and so the driver 4 does not typically have any local information as to which data buffers (render targets) are accessed by different rendering jobs.

Thus, the host processor (CPU) 1 (driver 4) is operable to identify possible WAR hazards when preparing graphics processor command streams. The host processor (CPU) 1 (driver 4) can then, and in the present embodiments does, include into the command stream a suitable 'possible WAR' barrier command. The graphics processor job manager circuit (a command stream frontend circuit) 35 when encountering such a barrier command in a command stream can then perform appropriate control to stall the next rendering job.

In the present embodiments, however, rather than simply enforcing the barrier whenever such a 'possible WAR' barrier command is encountered, the job manager circuit (a command stream frontend circuit) 35 of the graphics processor is further configured to determine whether or not there is an actual WAR dependency. The present embodiments thus provide a mechanism for the graphics processor to check, after the host processor (CPU) 1 has identified a possible WAR hazard and included a suitable 'possible WAR' barrier command in a command stream accordingly, whether or not the barrier actually needs to be enforced.

In particular, to do this, a Bloom filter is maintained using a set of registers accessible to the job manager circuit (a command stream frontend circuit) 35. A Bloom filter is a probabilistic data structure that allows checking if an element might be part of a set. It has no false negatives but some (non-zero) probability of false positives. Thus, the Bloom filter can be used to check whether there is "possible overlap" between the data buffers (render targets) that are accessed by the rendering jobs for which a possible WAR hazard has been identified (in which case the barrier should still be enforced) or whether there is "definitely no overlap" between the data buffers (render targets), in which case it is safe to ignore the barrier.

The likelihood of false positives depends on the number of elements in the set and the number of bits in the bloom filter. A general rule of thumb is that fewer than 10 bits per element are required for a 1% false positive probability. Assuming that there are unlikely to be a huge number of WAR transitions in a single pipeline barrier, this means that a relatively small Bloom filter (e.g. 256 bits) could be used to detect all WAR dependencies with a low number of false positives. If a particular graphics processing workload uses more WAR transitions, there will simply be a degradation in performance, but the present embodiments still ensure a safe (artefact-free) operation.

This then means that the Bloom filter can be maintained entirely in the set of registers accessible to the job manager circuit (a command stream frontend circuit) 35, such that this checking can be done within the job manager circuit (a command stream frontend circuit) 35, without requiring external memory access.

Figure 13:
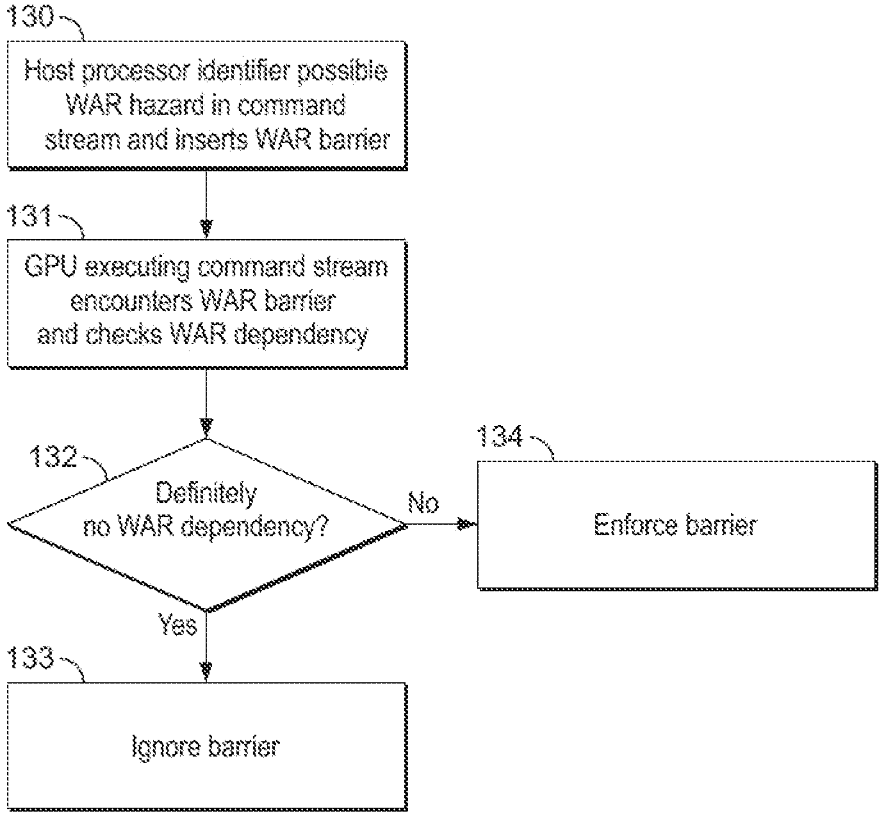
FIG. 13 is a flow chart illustrating a 'write-after-read' hazard detection mechanism according to an embodiment.

FIG. 13 is a flow chart illustrating the WAR hazard detection mechanism of the present embodiments.

As shown in FIG. 13, the host processor (CPU) 1 is operable to identify possible WAR hazards (this is done by detecting memory access (layout) transitions). Thus, when the host processor (CPU) 1 identifies a possible WAR hazard in a command stream, the driver 4 can then insert a suitable WAR barrier into the appropriate command stream (step 130).

The command streams prepared by the host processor (CPU) 1, including any such barriers, will then be submitted to the graphics processor for processing, in particular with the job manager circuit (a command stream frontend circuit) 35 receiving and processing such command streams appropriately, as described above. In response to the job manager circuit (a command stream frontend circuit) 35 encountering a WAR barrier in a command stream, the job manager circuit (a command stream frontend circuit) 35 is then operable and configured to check whether there is an actual WAR dependency (step 131), in particular by checking whether there is any overlap between the data buffers (render targets) that will be accessed by the render passes in question.

As mentioned above, this check is performed probabilistically, e.g. using a Bloom filter, such that it can be determined either that there is "possible overlap" (and hence some possibility that there is an actual WAR dependency) or "definitely no overlap" (and hence no possibility of an actual WAR dependency). Thus, if it can be determined that there is definitely no WAR dependency (step 132—yes), this means that the barrier can safely be ignored, and the job manager circuit (a command stream frontend circuit) 35 therefore does so. On the other hand, if there is any possibility of a WAR dependency (i.e. it cannot definitely be determined that there is no WAR dependency) (step 132—no), the barrier should be, and therefore is, enforced to enforce the WAR dependency.

Figure 14:
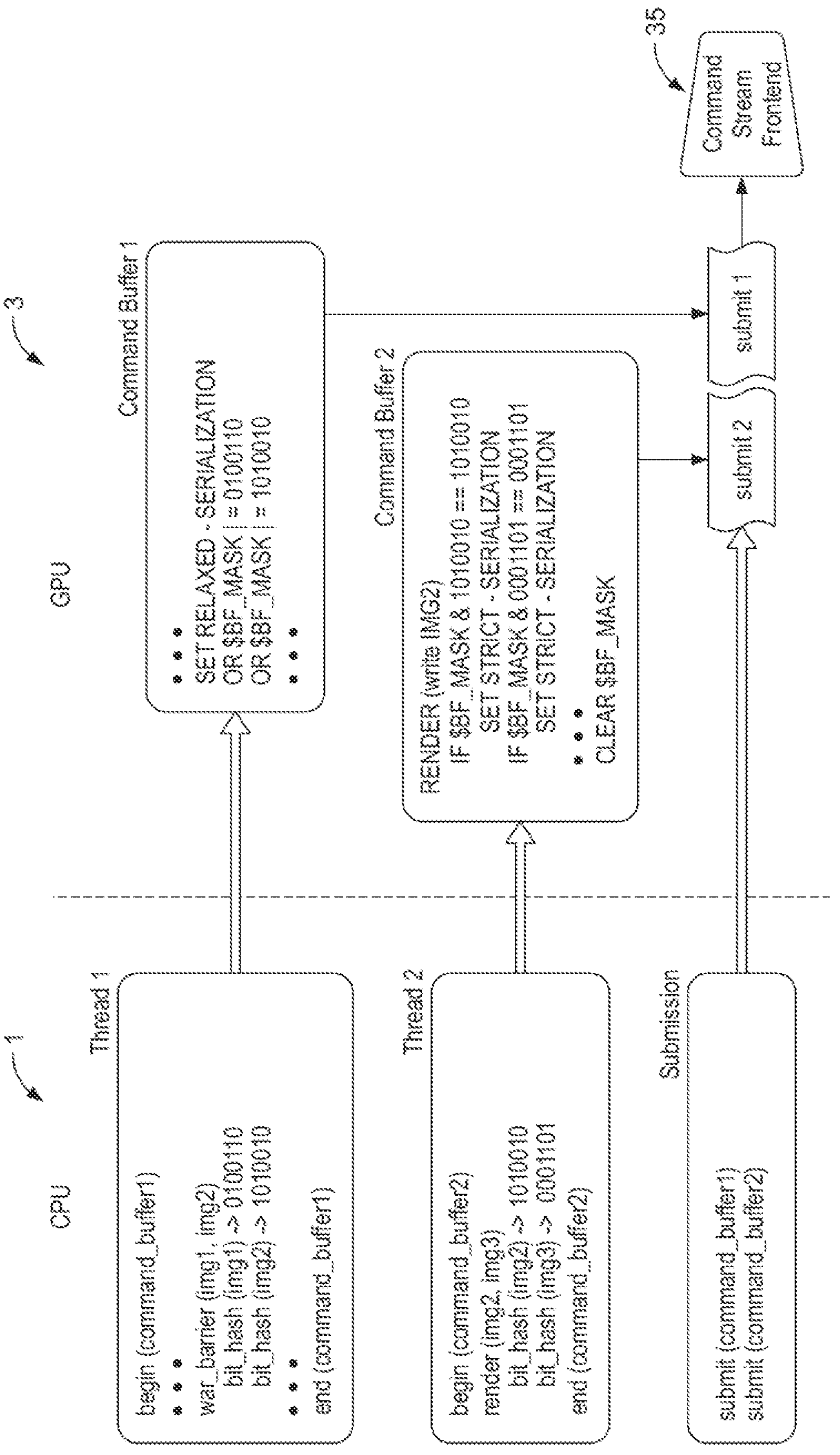
FIG. 14 shows the 'write-after-read' hazard detection mechanism according to an embodiment in more detail.

FIG. 14 illustrates the WAR hazard detection mechanism in more detail. In particular, FIG. 14 shows the operation of the host processor (CPU) 1 when submitting command streams to the graphics processor 3 for processing.

In the example shown in FIG. 14, the graphics processor is currently performing processing for a first rendering job that involves two render targets, namely a first image ('img1') and a second image ('img2') (wherein the host processor (CPU) 1 has previously prepared and submitted a 'render ( )' command to cause the graphics processor to perform this first rendering job).

As shown in FIG. 14, a first host processor (CPU) 1 thread (Thread1) is executing a suitable command to begin preparing a first command buffer ('begin(command_buffer1)') which in this case is for pipeline barrier insertion. In this example, the first host processor (CPU) 1 thread (Thread1) identifies that there is a possible WAR hazard due to a layout transition affecting the two render targets ('img1' and 'img2') that are being used for the first rendering job (in particular there is a change from a 'read-only' state to a 'write-only' state). A suitable barrier command ('war_barrier(img1,img2)') is thus inserted into the command stream at this point. In this example, it can be seen that the next rendering job (for which a 'render ( )' command is being prepared by a second host processor (CPU) 1 thread (Thread2)) does also access the second render target (i.e. 'img2') and so there is an actual WAR hazard that must be managed appropriately (although in this example there is no overlap between the other render targets, i.e. 'img1' and 'img3', accessed by the different rendering jobs). However, because the command for the subsequent rendering job is being prepared in a separate command buffer by the second host processor (CPU) 1 thread (Thread2), the first host processor (CPU) 1 thread (Thread1) does not know whether the next rendering job will actually write to either of the render targets being used by the current rendering job. Thus, the first host processor (CPU) 1 thread (Thread1) can identify that there is a possible WAR hazard between the different render jobs, due to the layout transitions, but does not have enough information to determine whether or not the rendering jobs require access to the same data buffers (render targets), such that there is an actual WAR hazard, i.e. where the later rendering job writes a render target that the earlier rendering job needs to read, as the command for performing the second rendering job ('render (img2, img3)') is in this example being prepared by the other host processor (CPU) 1 thread (Thread2).

The first host processor (CPU) 1 thread (Thread1) thus submits its command buffer to the graphics processor for execution and this causes a processing barrier to be inserted into the graphics processor command stream. As part of this, a relaxed (less strict) serialization mode may be set in which dependencies (e.g. 'read-after-write' dependencies may be managed as described above (e.g. in relation to FIGS. 3 to 11).

As mentioned above, the job manager circuit (a command stream frontend circuit) 35 is operable and configured to check whether there is an actual WAR dependency (i.e. step 131 in FIG. 13), in particular by checking whether there is any overlap between the data buffers (render targets) that will be accessed by the render passes in question. To do this, as mentioned above, a Bloom filter is in an embodiment calculated for each of the rendering jobs based on the render targets accessed by those jobs. Thus, as shown in FIG. 14, the first host processor (CPU) 1 thread (Thread1) when preparing the barrier command is also configured to calculate suitable bit hashes over the render targets for the first rendering job to determine which bits to set in a respective Bloom filter mask for the first rendering job. When the barrier command is submitted to the graphics processor, the Bloom filter mask for the first rendering job is then stored in one or more registers.

Correspondingly, the second host processor (CPU) 1 thread (Thread2) when preparing the subsequent rendering command is also configured to calculate hashes over any render targets that will be written to the second rendering job. When the job manager circuit (a command stream frontend circuit) 35 encounters the second rendering job a check is then performed using the hashes calculated for the second rendering job to see whether the corresponding bit in the stored Bloom filter for the first rendering job is set for any of the written-to render targets. If so, a strict-serialisation mode is set (i.e. step 134 in FIG. 13) (and this will be the case in this example since the testing will find possible (and actual) overlap between the rendering jobs in respect of the second render target 'img2' so that stricter serialisation should be (and is) enforced between the rendering jobs).

Thus, as shown in FIG. 14, a suitable barrier ('war_barrier( ) function') is inserted into the command stream to perform the desired WAR hazard handling before the second rendering job is performed. When the barrier is encountered, it can thus be checked using the Bloom filters for the two rendering jobs whether or not there is any potential overlap between the data buffers (render targets) for the render passes from the different command buffers since at this point it is known which images will write in the upcoming render pass. Thus, to detect possible WAR hazards, the Bloom filter hashes can be suitably calculated for each written-to image when the host processor (CPU) 1 is preparing the respective command buffers. When the job manager circuit (a command stream frontend circuit) 35 is processing these commands, for each hash, it can then be checked whether the corresponding bit is set in the Bloom filter (and hence whether stricter serialization is required to enforce the WAR dependency). If any of them are zero then there is no WAR dependency for the image, and the barrier can be safely ignored.

Various other examples would be possible.

The foregoing detailed description has been presented for the purposes of illustration and description. It is not intended to be exhaustive or to limit the technology described herein to the precise form disclosed. Many modifications and variations are possible in the light of the above teaching. The described embodiments were chosen in order to best explain the principles of the technology described herein and its practical applications, to thereby enable others skilled in the art to best utilise the technology described herein, in various embodiments and with various modifications as are suited to the particular use contemplated. It is intended that the scope be defined by the claims appended hereto.

The invention claimed is:

1. A graphics processor, the graphics processor including:

a command stream processing circuit; and a control circuit, the control circuit configured to:

when the command stream processing circuit is processing one or more command streams to perform a sequence of rendering jobs, wherein each rendering job in the sequence of rendering jobs is potentially operable to read data from or write data to one or more of a set of available data buffers according to a set of memory access conditions defined for the rendering job in question that define respective memory access permissions for the data buffers in the set of available data buffers:

in response to the command stream processing circuit encountering in a command steam an indication that there is a possible write-after-read (WAR) hazard between a second, later rendering job and a first, earlier rendering job in the sequence of rendering jobs:

(i) determine whether the possible WAR hazard can be safely ignored by determining whether there is any potential overlap in the set of available data buffers between the data buffers that the second, later rendering job potentially writes to and the data buffers that the first, earlier rendering job may need to read data from, the determining performed using an approximate set membership query filter that is configured such that the approximate set membership query filter may falsely determine that there is overlap between the data buffers used by the different rendering jobs even when no such overlap exists but will never falsely determine that there is no overlap between the data buffers used by the different rendering jobs when such overlap does exist; and (ii) when it is determined that the possible WAR hazard between the second, later rendering job and the first, earlier rendering job can be safely ignored: permit the command stream processing circuit of the graphics processor to start issuing processing jobs for the second, later rendering job for processing.

2. The graphics processor of claim 1, wherein when it is cannot be determined that the possible WAR hazard can be safely ignored, the control circuit is configured to stall processing of the second, later rendering job until the first, earlier rendering job has completed all of its processing.

3. The graphics processor of claim 1, wherein the approximate set membership query is performed using a Bloom filter.

4. The graphics processor of claim 1, wherein the graphics processor includes a command stream processing circuit that is configured to receive command streams received from a host processor and in response to a command included in a command stream to perform a rendering job to issue one or more processing jobs to the graphics processor to cause the graphics processor to perform the rendering job, and wherein the determining whether the possible WAR hazard can be safely ignored is performed within the command stream processing circuit, prior to issuing a processing job to the graphics processor to cause the graphics processor to perform the second, later rendering job.

5. The graphics processor of claim 4, wherein the indication that there is a possible WAR hazard between a second, later rendering job and a first, earlier rendering job in the sequence of rendering jobs is provided by the host processor when preparing the one or more command streams for the graphics processor and can be identified within the command stream by the command stream processing circuit.

6. A graphics processor, the graphics processor comprising a control circuit configured to:

when the graphics processor is performing a sequence of rendering jobs, wherein each rendering job in the sequence of rendering jobs is potentially operable to read data from or write data to one or more of a set of available data buffers according to a set of memory access conditions defined for the rendering job in question that define respective memory access permissions for the data buffers in the set of available data buffers:

determine whether a second, later rendering job in the sequence of rendering jobs potentially depends on a first, earlier rendering job in the sequence of rendering jobs by identifying whether there is potential overlap between the data buffers that are to be accessed by the second rendering job and the data buffers that are to be accessed by the first rendering job by using an approximate set membership query that is configured such that the approximate set membership query may falsely determine that there is overlap between the data buffers used by the different rendering jobs even when no such overlap exists but will never falsely determine that there is no overlap between the data buffers used by the different rendering jobs when such overlap does exist; and when it is detected that the second, later rendering job in the sequence of rendering jobs potentially depends on the first, earlier rendering job in the sequence of rendering jobs: control processing of the second, later rendering job to enforce the dependency.

7. A method of operating a host processor for a graphics processing system when preparing one or more command streams for a graphics processor, the method comprising:

the host processor:

when preparing one or more command streams for the graphics processor to perform a sequence of rendering jobs, wherein each rendering job in the sequence of rendering jobs is potentially operable to read data from or write data to one or more of a set of available data buffers according to a set of memory access conditions defined for the rendering job in question that define respective memory access permissions for the data buffers in the set of available data buffers:

(i) detecting possible write-after-read (WAR) hazards in which a later rendering job in the sequence of rendering jobs potentially writes to a data buffer that an earlier rendering job in the sequence of rendering jobs may need to read data from by identifying whether the memory access permissions for any of the data buffers in the set of available data buffers change between the earlier and later passes from a state in which data can be read from the data buffer to a state in which data can be written to the data buffer; and (ii) when a possible WAR hazard is detected between a second, later rendering job and a first, earlier rendering job in the sequence of rendering jobs to be performed, providing with the command stream associated with the second, later rendering job an indication that a possible WAR hazard has been detected relating to the first, earlier rendering job.

8. A computer program product comprising instructions that when executed by a data processor will cause the data processor to perform a method as claimed in claim 7.

* * * * *